United States Patent
Nitta et al.

(10) Patent No.: US 8,271,921 B2
(45) Date of Patent: Sep. 18, 2012

(54) AUTOMATIC CIRCUIT DESIGN TECHNIQUE USING PARETO OPTIMAL SOLUTIONS

(75) Inventors: Izumi Nitta, Kawasaki (JP); Yu Liu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 12/888,700

(22) Filed: Sep. 23, 2010

(65) Prior Publication Data
US 2011/0239182 A1    Sep. 29, 2011

(30) Foreign Application Priority Data
Sep. 25, 2009    (JP) ................................. 2009-219920

(51) Int. Cl.
*G06F 17/50*    (2006.01)
(52) U.S. Cl. ...................................................... 716/110
(58) Field of Classification Search .................. 716/100, 716/110
See application file for complete search history.

(56) References Cited

U.S. PATENT DOCUMENTS

| | | | |
|---|---|---|---|
| 6,606,729 B2 | 8/2003 | Gross et al. | |
| 6,757,873 B2 | 6/2004 | Yamaguchi | |
| 6,968,517 B2 | 11/2005 | McConaghy | |
| 2005/0257178 A1 | 11/2005 | Daems et al. | |
| 2006/0257178 A1* | 11/2006 | Pargett ........................... | 399/302 |
| 2007/0208548 A1* | 9/2007 | McConaghy ..................... | 703/2 |
| 2009/0182695 A1 | 7/2009 | Yanami et al. | |
| 2010/0083196 A1* | 4/2010 | Liu .................................... | 716/2 |
| 2010/0199186 A1* | 8/2010 | Bonabeau et al. ............. | 715/733 |
| 2011/0078100 A1* | 3/2011 | Goel ................................ | 706/13 |

FOREIGN PATENT DOCUMENTS

| | | | |
|---|---|---|---|
| JP | 4-260973 A | 9/1992 |
| JP | 6-139303 A | 5/1994 |
| JP | 6-348683 A | 12/1994 |
| JP | 7-066294 A | 3/1995 |
| JP | 2004-061372 A | 2/2004 |
| JP | 2004-118719 A | 4/2004 |
| JP | 2004-145410 A | 5/2004 |
| JP | 2005-055960 A | 3/2005 |
| JP | 2005-070849 A | 3/2005 |
| WO | WO 2006/017247 | 2/2006 |
| WO | WO 2006/039165 | 4/2006 |

OTHER PUBLICATIONS

Fletcher, Roger "Practical Methods of Optimization", John Wiley & Sons, Second Edition Mar. 1991, pp. 16-19.

Seshadri, Aravind "NSGA-II: A multi-objective optimization algorithm", http://www.mathworks.com/matlabcentral/fileexchange/10429, May 19, 2006.

(Continued)

*Primary Examiner* — Suchin Parihar
(74) *Attorney, Agent, or Firm* — Fujitsu Patent Center

(57) ABSTRACT

A set of pareto optimal solutions that are non-dominated solutions in a solution specification space for respective items in requirement specification is extracted with a combination of a circuit configuration including a specific function and a process constraint condition. Furthermore, pareto optimal solutions are extracted for all combinations of the circuit configuration and the process constraint condition, and pareto optimal solutions are extracted for the respective process constraint conditions. When such extracted data is distributed to designers, it is possible to reduce time to generate the pareto optimal solutions, and the designers can design the optimum circuit having a desired function by using such extracted data.

11 Claims, 33 Drawing Sheets

OTHER PUBLICATIONS

Tiwary, Saurabh K. et al., "Generation of Yield-Aware Pareto Surfaces for Hierarchical Circuit Design Space Exploration", In DAC 2006. Proceedings of the 43rd annual Design Automation Conference, Jul. 24-28, 2006, pp. 31-36.

Yu, Guo et al., "Yield-Aware Analog Integrated Circuit Optimization Using Geostatistics Motivated Performance Modeling", In ICCAD 2007. Proceedings of the 2007 IEEE/ACM International Conference on Computer-Aided Design, Nov. 5-8, 2007, pp. 464-469.

* cited by examiner

| DIRECT CONSTRAINT CONDITION | MATCHING | W1=W2 |
|---|---|---|
| | SYSTEM REQUIREMENT | −40°C≦T90°C |
| INDIRECT CONSTRAINT CONDITION | MANDATORY PERFORMANCE | Area≦0.5mm² |

| ITEM | REQUIREMENT |
|---|---|
| CONSUMED ELECTRIC CURRENT | ≦5mA |
| THD (Total harmonic distortion) | ≦−40dB |
| DC GAIN | −3dB~2dB |
| BANDWIDTH | ≧1GHz |

| PROCESS CONSTRAINT CONDITION A | 45nm |
|---|---|
| PROCESS CONSTRAINT CONDITION B | 90nm |
| ⋮ | ⋮ |

| PROCESS CONSTRAINT CONDITION A | 45nm | 45nm≤L≤1.5um |
| | | 0.1um≤W≤10um |
| | | LOW LEAKAGE |
| PROCESS CONSTRAINT CONDITION B | 45nm | 45nm≤L≤1.5um |
| | | 0.1um≤W≤10um |
| | | HIGH LEAKAGE |
| ⋮ | ⋮ | ⋮ |

| CIRCUIT CONFIGURATION | PROCESS CONSTRAINT CONDITION | DESIGN VARIABLE 1 | DESIGN VARIABLE 2 | DESIGN VARIABLE 3 | ... | PERFORMANCE ITEM 1 | PERFORMANCE ITEM 2 | PERFORMANCE ITEM 3 | PERFORMANCE ITEM 4 | ... |
|---|---|---|---|---|---|---|---|---|---|---|
| CIRCUIT 1 | PROCESS A | ZA1 | ZB1 | ZC1 | | A1 | B1 | C1 | D1 | |
| CIRCUIT 1 | PROCESS A | ZA2 | ZB2 | ZC2 | | A2 | B2 | C2 | D2 | |
| CIRCUIT 1 | PROCESS A | ZA3 | ZB3 | ZC3 | | A3 | B3 | C3 | D3 | |
| CIRCUIT 1 | PROCESS A | ZA4 | ZB4 | ZC4 | | A4 | B4 | C4 | D4 | |
| CIRCUIT 1 | PROCESS A | ZA5 | ZB5 | ZC5 | | A5 | B5 | C5 | D5 | |
| ... | ... | ... | ... | ... | ... | ... | ... | ... | ... | ... |
| CIRCUIT 1 | PROCESS B | ZA11 | ZB11 | ZC11 | | A11 | B11 | C11 | D11 | |
| CIRCUIT 1 | PROCESS B | ZA12 | ZB12 | ZC12 | | A12 | B12 | C12 | D12 | |
| CIRCUIT 1 | PROCESS B | ZA13 | ZB13 | ZC13 | | A13 | B13 | C13 | D13 | |
| CIRCUIT 1 | PROCESS B | ZA14 | ZB14 | ZC14 | | A14 | B14 | C14 | D14 | |
| CIRCUIT 1 | PROCESS B | ZA15 | ZB15 | ZC15 | | A15 | B15 | C15 | D15 | |
| ... | ... | ... | ... | ... | ... | ... | ... | ... | ... | ... |
| CIRCUIT 2 | PROCESS A | ZA6 | ZB6 | ZC6 | | A6 | B6 | C6 | D6 | |
| CIRCUIT 2 | PROCESS A | ZA7 | ZB7 | ZC7 | | A7 | B7 | C7 | D7 | |
| CIRCUIT 2 | PROCESS A | ZA8 | ZB8 | ZC8 | | A8 | B8 | C8 | D8 | |
| CIRCUIT 2 | PROCESS A | ZA9 | ZB9 | ZC9 | | A9 | B9 | C9 | D9 | |
| CIRCUIT 2 | PROCESS A | ZA10 | ZB10 | ZC10 | | A10 | B10 | C10 | D10 | |
| ... | ... | ... | ... | ... | ... | ... | ... | ... | ... | ... |

| CIRCUIT CONFIGURATION | PROCESS CONSTRAINT CONDITION | DESIGN VARIABLE 1 | DESIGN VARIABLE 2 | DESIGN VARIABLE 3 | ... | PERFORMANCE ITEM 1 | PERFORMANCE ITEM 2 | PERFORMANCE ITEM 3 | PERFORMANCE ITEM 4 | ... |
|---|---|---|---|---|---|---|---|---|---|---|
| CIRCUIT 1 | PROCESS A | ZA1 | ZB1 | ZC1 | | A1 | B1 | C1 | D1 | |
| CIRCUIT 1 | PROCESS A | ZA2 | ZB2 | ZC2 | | A2 | B2 | C2 | D2 | |
| CIRCUIT 1 | PROCESS A | ZA3 | ZB3 | ZC3 | | A3 | B3 | C3 | D3 | |
| CIRCUIT 2 | PROCESS A | ZA6 | ZB6 | ZC6 | | A6 | B6 | C6 | D6 | |
| CIRCUIT 2 | PROCESS A | ZA7 | ZB7 | ZC7 | | A7 | B7 | C7 | D7 | |
| ... | ... | ... | ... | ... | | ... | ... | ... | ... | |

FIG.24

| CIRCUIT CONFIGURATION | PROCESS CONSTRAINT CONDITION | DESIGN VARIABLE 1 | DESIGN VARIABLE 2 | DESIGN VARIABLE 3 | ... | PERFORMANCE ITEM 1 | PERFORMANCE ITEM 2 | PERFORMANCE ITEM 3 | PERFORMANCE ITEM 4 | ... |
|---|---|---|---|---|---|---|---|---|---|---|
| CIRCUIT 1 | PROCESS A | ZA1 | ZB1 | ZC1 | | A1 | B1 | C1 | D1 | |
| CIRCUIT 1 | PROCESS A | ZA2 | ZB2 | ZC2 | | A2 | B2 | C2 | D2 | |
| CIRCUIT 2 | PROCESS B | ZA9 | ZB9 | ZC9 | | A9 | B9 | C9 | D9 | |
| CIRCUIT 2 | PROCESS B | ZA10 | ZB10 | ZC10 | | A10 | B10 | C10 | D10 | |
| ... | ... | ... | ... | ... | | ... | ... | ... | ... | |

| PVT CORNER SETTING ITEM | MIN | TYP | MAX |
|---|---|---|---|
| Leff | min1 | typ1 | max1 |
| Vth | min2 | typ2 | max2 |
| Tox | min3 | typ3 | max3 |
| PolyCD | | typ4 | |
| rshncd | min5 | typ5 | max5 |
| rshpcd | min6 | typ6 | max6 |
| ⋮ | ⋮ | ⋮ | ⋮ |
| V | min7 | typ7 | max7 |
| T | min8 | typ8 | max8 |

| PVT CORNER SETTING ITEM | APPEARANCE RANGE DATA | COMBINATION INFO. |
|---|---|---|
| Leff | GAUSS, $\mu_1, \sigma_1$ | min,max |
| Vth | GAUSS, $\mu_2, \sigma_2$ | min,max |
| Tox | GAUSS, $\mu_3, \sigma_3$ | min,typ,max |
| PolyCD | GAUSS, $\mu_4, \sigma_4$ | min,max |
| rshncd | GAUSS, $\mu_5, \sigma_5$ | typ |
| rshpcd | GAUSS, $\mu_6, \sigma_6$ | min,max |
| ⋮ | ⋮ | ⋮ |
| V | UNIFORM,a,b,c | min,max |
| T | UNIFORM,d,e,f | min,max |

FIG.33

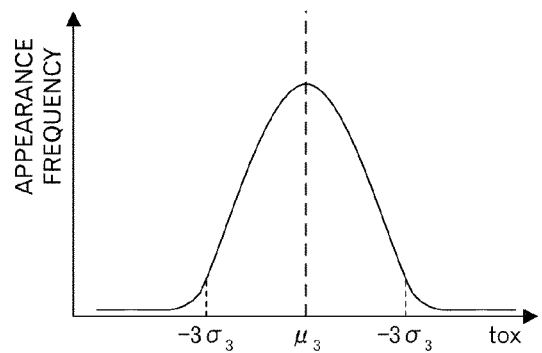

FIG.34

| PVT CORNER SETTING ITEM | DISTRIBUTION DATA OF RANDOM NUMBER GENERATION |
|---|---|
| Leff | GAUSS, $\mu_{11}, \sigma_{11}$ |
| Vth | GAUSS, $\mu_{12}, \sigma_{12}$ |
| Tox | GAUSS, $\mu_{13}, \sigma_{13}$ |
| PolyCD | GAUSS, $\mu_{14}, \sigma_{14}$ |
| rshncd | GAUSS, $\mu_{15}, \sigma_{15}$ |
| rshpcd | GAUSS, $\mu_{16}, \sigma_{16}$ |
| ⋮ | ⋮ |
| V | UNIFORM,a,b,c |
| T | UNIFORM,d,e,f |

FIG.35

| CIRCUIT CONFIGURATION | PROCESS CONSTRAINT CONDITION | DESIGN VARIABLE 1 | DESIGN VARIABLE 2 | ... | PVT CORNER SETTING ITEM 1 | PVT CORNER SETTING ITEM 2 | ... | PERFORMANCE ITEM 1 | PERFORMANCE ITEM 2 | PERFORMANCE ITEM 3 | ... |
|---|---|---|---|---|---|---|---|---|---|---|---|
| CIRCUIT 1 | PROCESS A | ZA1 | ZB1 | | PVT11 | PVT21 | | A1 | B1 | C1 | |

FIG.40

| CIRCUIT CONFIGURATION | PROCESS CONSTRAINT CONDITION | DESIGN VARIABLE 1 | DESIGN VARIABLE 2 | ... | PVT CORNER SETTING ITEM 1 | PVT CORNER SETTING ITEM 2 | ... | PERFORMANCE ITEM 1 | PERFORMANCE ITEM 2 | PERFORMANCE ITEM 3 | ... |
|---|---|---|---|---|---|---|---|---|---|---|---|
| CIRCUIT 1 | PROCESS A | ZA1 | ZB1 | ... | PVT11 | PVT21 | ... | A1 | B1 | C1 | ... |
| CIRCUIT 1 | PROCESS A | ZA2 | ZB2 | | PVT12 | PVT22 | | A2 | B2 | C2 | |
| CIRCUIT 1 | PROCESS A | ZA3 | ZB3 | | PVT13 | PVT23 | | A3 | B3 | C3 | |
| CIRCUIT 1 | PROCESS A | ZA4 | ZB4 | | PVT14 | PVT24 | | A4 | B4 | C4 | |
| CIRCUIT 1 | PROCESS A | ZA5 | ZB5 | | PVT15 | PVT25 | | A5 | B5 | C5 | |
| ... | ... | ... | ... | ... | ... | ... | ... | ... | ... | ... | ... |
| CIRCUIT 1 | PROCESS B | ZA11 | ZB11 | | PVT31 | PVT41 | | A11 | B11 | C11 | |
| CIRCUIT 1 | PROCESS B | ZA12 | ZB12 | | PVT32 | PVT42 | | A12 | B12 | C12 | |
| CIRCUIT 1 | PROCESS B | ZA13 | ZB13 | | PVT33 | PVT43 | | A13 | B13 | C13 | |
| CIRCUIT 1 | PROCESS B | ZA14 | ZB14 | | PVT34 | PVT44 | | A14 | B14 | C14 | |
| CIRCUIT 1 | PROCESS B | ZA15 | ZB15 | | PVT35 | PVT45 | | A15 | B15 | C15 | |
| ... | ... | ... | ... | ... | ... | ... | ... | ... | ... | ... | ... |
| CIRCUIT 2 | PROCESS A | ZA6 | ZB6 | | PVT16 | PVT26 | | A6 | B6 | C6 | |
| CIRCUIT 2 | PROCESS A | ZA7 | ZB7 | | PVT17 | PVT27 | | A7 | B7 | C7 | |
| CIRCUIT 2 | PROCESS A | ZA8 | ZB8 | | PVT18 | PVT28 | | A8 | B8 | C8 | |
| CIRCUIT 2 | PROCESS A | ZA9 | ZB9 | | PVT19 | PVT29 | | A9 | B9 | C9 | |
| CIRCUIT 2 | PROCESS A | ZA10 | ZB10 | | PVT20 | PVT30 | | A10 | B10 | C10 | |
| ... | ... | ... | ... | ... | ... | ... | ... | ... | ... | ... | ... |

FIG.42

AUTOMATIC CIRCUIT DESIGN TECHNIQUE USING PARETO OPTIMAL SOLUTIONS

CROSS-REFERENCE TO RELATED APPLICATIONS

This application is based upon and claims the benefit of priority of the prior Japanese Patent Application No. 2009-219920, filed on Sep. 25, 2009, the entire contents of which are incorporated herein by reference.

FIELD

This technique relates to an automatic circuit design technique.

BACKGROUND

Because of the increase of the analog and digital mixed circuit design and/or a lack of analog circuit designers, demands to utilize analog circuits, which were designed in the past, as Intellectual Property (IP) are increasing. When IP data is reused, optimization by a manufacturing process designated according to the circuit specification or selection of the optimum manufacturing process is carried out. Therefore, the optimization technique considering the manufacturing process is requested.

At present, various techniques for the automatic circuit design and circuit optimization exist. However, the designer carries out a lot of circuit simulations, and it may take several days to determine the circuit configuration and parameters for the circuit configuration. As a matter of course, when the designer manually carries out the design and optimization without using such techniques for the automatic circuit design and circuit optimization, not only it takes a long time so much, but also the quality and/or period required for the design may vary depending on the skill level of the designer. Furthermore, the period for the optimization work tends to increase, because of the process miniaturization.

As described above, there is no technique to rapidly reduce the turn around time for the automatic circuit design and optimization.

SUMMARY

As one aspect of this technique, a pareto data generation method for an automatic circuit design, includes: (A) extracting a circuit configuration having a specific function from a circuit configuration data storage device storing data of a plurality of circuit configurations; (B) for each combination of the extracted circuit configuration and a process constraint condition among a plurality of process constraint conditions, which are constraint conditions for manufacturing processes to be commonly used for the plurality of circuit configurations and are stored in a process constraint condition storage device, (1) obtaining simulation results for respective items in requirement specification by circuit simulation, while changing values of respective design variables in the circuit configuration a plurality of times so as to satisfy the process constraint condition and a constraint condition of the extracted circuit configuration, (2) extracting, from the simulation results, pareto optimal solutions that are non-dominated solutions in a solution specification space for the respective items in the requirement specification, and (3) storing pertinent values of the respective design variables and pertinent values of the respective items in the requirement specification for each of the extracted pareto optimal solutions into an individual pareto data storage device in association with a combination of an identifier of the process constraint condition and an identifier of the extracted circuit configuration; (C) for each of the process constraint conditions, extracting second pareto optimal solutions that are non-dominated solutions among all of the pareto optimal solutions stored in said individual pareto data storage device in association with the process constraint condition, and for each of the process constraint conditions, storing an identifier of the circuit configuration, the pertinent values of the respective design variables and the pertinent values of the respective items in the requirement specification, which correspond to each of the second pareto optimal solutions, into a pareto-per-process data storage device; and (D) extracting third pareto optimal solutions that are non-dominated solution among all of the pareto optimal solutions stored in the individual pareto data storage device, and storing the combination of the identifier of the circuit configuration and the identifier of the process constraint condition, the pertinent values of the respective design variables and the pertinent values of the respective items in the requirement specification, which correspond to each of the third pareto optimal solutions, into an entire pareto data storage device.

As another aspect of this technique, an automatic circuit design method according to a second aspect includes (A) accepting designation of first optimization or second optimization, wherein the first optimization is optimization for a specific process constraint condition among a plurality of process constraint conditions, which are stored in a process constraint condition storage device and are constraint conditions for manufacturing processes, and the second optimization is optimization for all of the plurality of process constraint conditions; (B) accepting an input for requirement specification of a circuit design; (C) when the designation is the first optimization, (1) reading out, as pareto optimal solution data, data for the specific process constraint condition, from a pareto-per-process data storage device storing first sets of an identifier of a circuit configuration, pertinent value of respective design variables and pertinent values of respective items in the requirement specification, wherein each of the first sets corresponds to each of pareto optimal solutions for each of the process constraint conditions, and when the designation is the second optimization, (2) reading out, as pareto optimal solution data, data from an entire pareto data storage device storing second sets of a combination of an identifier of a circuit configuration and an identifier of a process constraint condition, pertinent value of respective design variables and pertinent values of respective items in the requirement specification, wherein each of the second sets corresponds to each of pareto optimal solutions for each combination of the process constraint condition and the circuit configuration; (D) calculating, as a provisional optimal solution, a point whose distance from a point corresponding to the requirement specification after space conversion of the solution specification space to balance value distribution for the respective items in the requirement specification, is shortest and which is on a pareto curve of second pareto optimal solutions obtained after the space conversion is carried out for pareto optimal solutions included in the read pareto optimal solution data, in the solution specification space after the space conversion; (E) extracting a pareto optimal solution close to the provisional optimal solution in the solution specification space after the space conversion, from the second pareto optimal solutions, and identifying circuit configuration for the provisional optimal solution from the extracted pareto optimal solution close to the provisional optimal solution; (F) mapping the provisional optimal solution to values of the respective design variables in the identified circuit configuration; and (G) outputting an identifier of the identified circuit configuration and the values of the respective design variables in the identified circuit configuration, which are obtained by the mapping.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 12 is a diagram depicting an example of data stored in an individual pareto data storage;

FIG. 19 is a diagram depicting an example of data stored in the pareto-per-process generation processing;

FIG. 24 is a diagram depicting an example of data stored in an entire pareto data storage;

FIG. 33 is a diagram depicting an example of data stored in a PVT corner setting data storage;

FIG. 34 is a schematic diagram to explain appearance distribution;

FIG. 35 is a diagram depicting an example of data stored in a PVT corner setting data storage;

FIG. 40 is a diagram depicting an example of data generated;

FIG. 42 is a diagram depicting an example of data stored in the individual pareto data storage in the second embodiment;

DESCRIPTION OF EMBODIMENTS

First, an outline of an embodiment of this technique will be explained by using FIG. 1. The reduction in the design time of the analog circuit has been carried out by utilizing past design properties (hereinafter, called "IP data"). In this embodiment, in order to further reduce the design time, new analog IP data 300 is defined as described below and a new analog IP data generation apparatus 100 is introduced to generate the new analog IP data 300. The new analog IP data 300 generated by this new analog IP data generation apparatus 100 is provided for users who actually conduct the circuit design with an automatic optimum circuit design apparatus 200 (or a program to realize this automatic optimum circuit design apparatus 200) to generate data for the optimal circuit configuration by using the new analog IP data 300. The users can obtain data for the circuit configuration realizing a performance near the requirement specification by instructing the automatic circuit design apparatus 200 to process the new analog IP data 300.

First Embodiment

Figure 2:
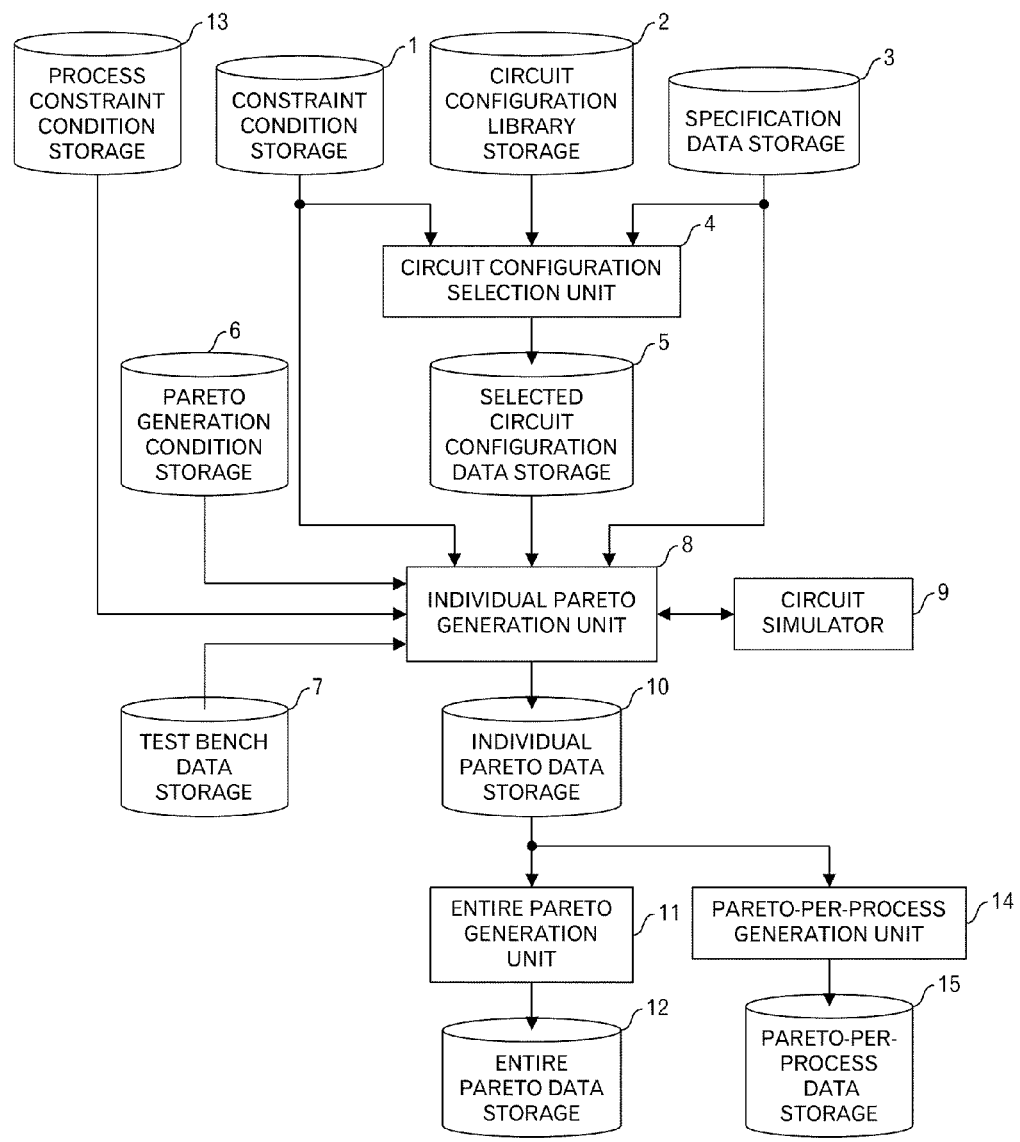
FIG. 2 is a functional block diagram of a new analog IP data generation apparatus in a first embodiment of this technique.

FIG. 2 depicts a functional block diagram of the new analog IP data generation apparatus 100 relating to a first embodiment of this technique. This analog IP data generation apparatus 100 has (A) a circuit configuration library storage 2 storing circuit configuration data of analog circuits, which has been designed but whose circuit parameters are not defined; (B) a constraint condition storage 1 storing constraint conditions (except constraint condition for manufacturing processes) for the respective circuit configurations; (C) a specification data storage 3 storing specification data of requirement specification for the new analog IP data 300; (D) a process constraint condition storage 13 storing plural process constraint conditions, which may be adopted at the circuit design; (E) a circuit configuration selection unit 4, which selects the circuit configurations having possibility that the requirement specification is satisfied, by using data stored in the constraint condition storage 1, the circuit configuration library storage 2 and the specification data storage 3; (F) a selected circuit configuration data storage 5 storing data for the circuit configuration selected by the circuit configuration selection unit 4; (G) a pareto generation condition storage 6 storing pareto generation conditions; (H) a test bench data storage 7 storing data for peripheral circuits used for the simulation for each type of the circuit configuration, for instance; (I) a circuit simulator 9 such as Simulation Program with Integrated Circuit Emphasis (SPICE); (J) an individual pareto generation unit 8 to cooperate with the circuit simulator 9 and to generate pareto optimal solutions (hereinafter, may be called "pareto". The pareto optimal solution will be explained later.) for each combination of the selected circuit configuration and the process constraint condition by using data stored in the constraint condition storage 1, the selected circuit configuration data storage 5, the specification data storage 3, the pareto generation condition storage 6, the test bench data storage 7 and the process constraint condition storage 13; (K) an individual pareto data storage 10 storing processing results of the individual pareto generation unit 8; (L) an entire pareto generation unit 11 to generate paretos for all of the selected circuit configurations and all of process constraint conditions by using data stored in the individual pareto data storage 10; (M) an entire pareto data storage 12 storing processing results by the entire pareto generation unit 11; (N) a pareto-per-process generation unit 14 to generate, for each of the process constraint conditions, paretos by using data stored in the individual pareto data storage 10; and (O) a pareto-per-process data storage 15 storing data generated by the pareto-per-process generation unit 14.

In addition, the circuit simulator 9 may be implemented as an apparatus different from the new analog IP data generation apparatus 100.

Figure 3:
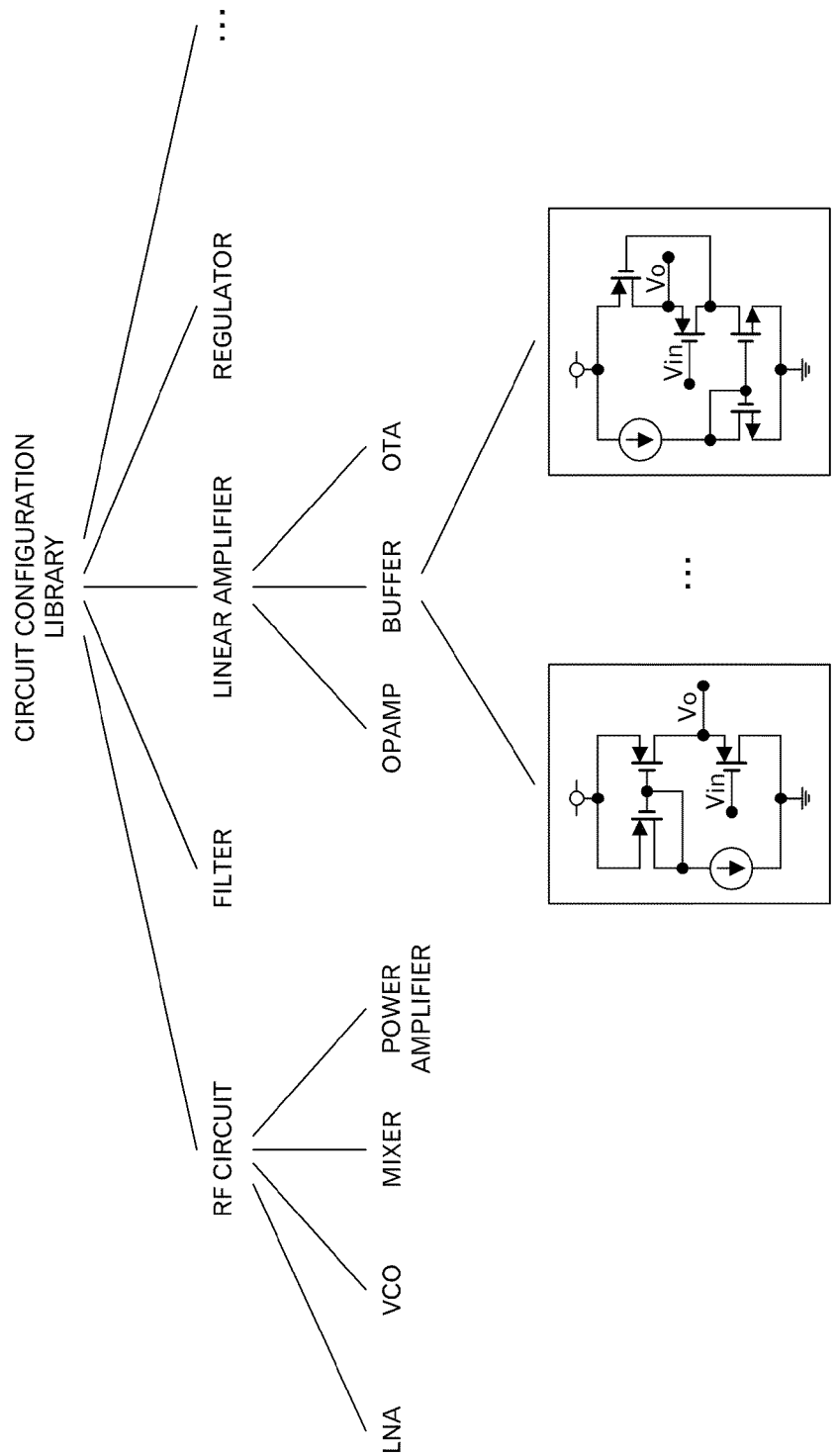
FIG. 3 is a diagram depicting an example of data stored in a circuit configuration library storage.

The circuit configuration library storage 2 stores circuit configurations in data structure as depicted in FIG. 3, for example. Namely, a tag representing characteristics and function of the circuit configuration is attached to each of the circuit configurations to construct a layer type of data structure depicted in FIG. 3. Therefore, a search for the circuit configurations having specific characteristics and function can be conducted. In an example of FIG. 3, functions are categorized, in the first layer, into, for example, an RF circuit, a filter, a linear amplifier, a regulator and the like. The second layer of the RF circuit includes a Low Noise Amplifier (LNA), a Voltage Controlled Oscillator (VCO), a mixer, a power amplifier and the like, and the second layer of the linear amplifier includes an operational amplifier (OPAMP), a buffer, an Operational Transconductance Amplifier (OTA) and the like. FIG. 3 schematically depicts that two different circuit configurations are registered for the buffer. For example, the circuit in the second layer is grasped as "a function" in the following.

Figures 1, 4, 5:
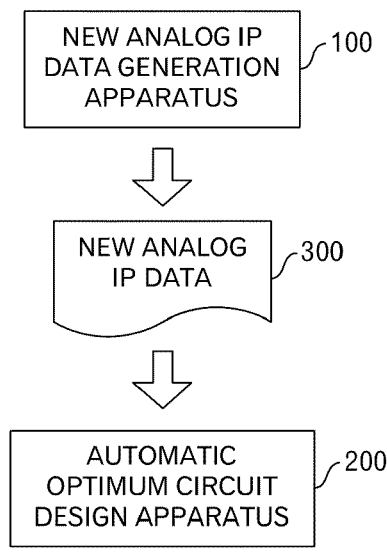
FIG. 1 is a conceptual diagram of an entire configuration in an embodiment of this technique.
FIG. 4 is a diagram depicting an example of data stored in a constraint condition storage.
FIG. 5 is a diagram depicting an example of data stored in a specification data storage.

In addition, the constraint condition storage 1 stores data as depicted, for example, in FIG. 4 for each circuit configuration. As depicted in FIG. 4, the constraint condition includes a direct constraint condition and an indirect constraint condition. The direct constraint condition includes a constraint condition by manufacturing conditions (a process, a design rule (the gate length L, gate width W and the like), a constraint condition (a matching condition, size proportional condition, and constraint condition between parameters) by the circuit operation principle and a constraint condition (an operational voltage, temperature and input condition) by a system requirement. Because the manufacturing conditions such as a process are defined separately from the constraint conditions in this embodiment, the manufacturing conditions are not included in the constraint conditions stored in the constraint condition storage 1. The indirect constraint condition is a condition representing a limitation from the mandatory performance to the circuit configuration parameters. In an example of FIG. 4, a condition for an area is defined. In addition to these conditions, constraint conditions such as a consumed power, Total Harmonic Distortion (THD), DC gain, and bandwidth may be defined. The constraint conditions are conditions for design variables that the designer can designate. As depicted in FIG. 4, a value range may be designated.

Furthermore, FIG. 5 depicts an example of data stored in the specification data storage 3. The requirement specification defines a characteristic value to be satisfied in the entire circuit, for each item, and a value is defined for each item such as the consumed electric current, THD, DC gain and the bandwidth in the example of FIG. 5. Other items may be adopted. The values of the items are defined as characteristics of the new analog IP data 300. Incidentally, in this embodiment, the specification data storage 3 also stores designation data designating what type of function is realized for the new analog IP data 300.

Figures 6, 7, 9:
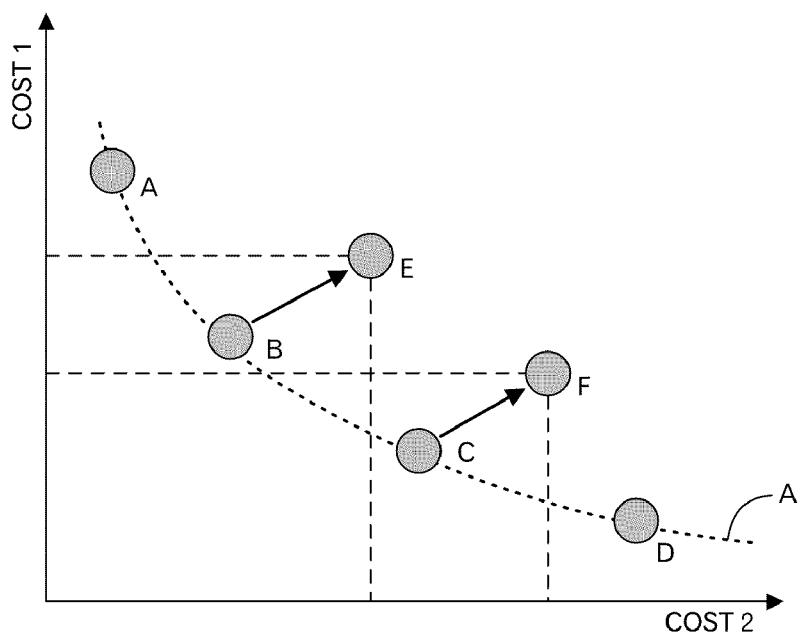
FIG. 6 is a diagram depicting an example of data stored in a process constraint condition storage.
FIG. 7 is a diagram depicting another example of data stored in the process constraint condition storage.
FIG. 9 is a schematic diagram to explain pareto optimum.

In addition, FIG. 6 depicts an example of data stored in the process constraint condition storage 13. The process constraint condition is a constraint condition when manufacturing a semiconductor chip including the designed circuit, and the process constraint condition includes a usable technology generation (e.g. the shortest wiring length such as 45 nm and 90 nm) as depicted in FIG. 6. Incidentally, the process constraint condition may include detailed conditions such as gate length L and gate width W. Moreover, as depicted in FIG. 7, based on the difference of the performance (e.g. low leakage or high leakage), the process constraint condition may be distinguished, even when the technology generation (e.g. 45 nm) is the same. In an example of FIG. 7, the gate length L and gate width W are the same as those for the process constraint conditions A and B. However, as depicted in FIG. 6, the process constraint conditions for the different technology generations may be mixed. Furthermore, the process constraint condition may be defined for each cost level. This is because the designer may desire to carry out the optimization considering the manufacturing cost. Incidentally, in this embodiment, the process constraint conditions are commonly used for all circuit configurations.

Next, an operation of the new analog IP data generation apparatus 100 will be explained by using FIGS. 8 to 24. First, the circuit configuration selection unit 4 identifies one unprocessed circuit function from the designated function data stored in the specification data storage 3 (step S1 in FIG. 8). Then, the circuit configuration selection unit 4 selects, from the circuit configuration library storage 2, the circuit configurations having possibility that the requirement specification stored in the specification data storage 3 is satisfied, from among the circuit configurations having the identified circuit function (e.g. "buffer") (step S3). As described above, the constraint conditions for each circuit configuration are stored in the constraint condition storage 1, and the circuit configuration, for which the constraint condition is defined that does not apparently satisfy the value for each item in the requirement specification, is excluded as a circuit configuration having no possibility that the requirement specification is satisfied. The circuit configuration selection unit 4 stores data for the selected circuit configurations into the selected circuit configuration data storage 5.

Next, the individual pareto generation unit 8 carries out an individual pareto generation processing (step S5). This individual pareto generation processing will be explained by using FIGS. 9 to 14.

First, the pareto will be explained by using FIG. 9. Here, it is presupposed that only two items exist in the requirement specification, that the first item is defined as "cost1" for the vertical axis and the lesser the value is, the lower the cost is, and that the second item is defined as "cost2" for the horizontal axis and the lesser the value is, the lower the cost is. Then, when the circuit simulation is carried out by using a specific set of circuit parameters to obtain values of the cost1 and cost2, it is possible to plot points on a two-dimensional space (called "solution space" or "solution specification space") as depicted in FIG. 9. In an example of FIG. 9, 6 points A to F (hereinafter, also called "solution") have been obtained. In such a situation, because the lesser value is naturally preferable for the cost1 and cost2, the closer to the origin the solution is, the better the solution is. Then, "X dominates Y" means all component values (i.e. cost) of Y are inferior to all corresponding component values of X. In the two-dimensional space as depicted in FIG. 9, because both values of the cost1 and cost2 of "B" are lesser than those of "E" and "B" is a better solution than "E", it can be said "B dominates E", and because "C" is a better solution than "F", it can be said "C dominates F". On the other hand, when "A" is compared with "B", it cannot be said "A dominates B", because the value of the cost2 of "A" is lesser than that of "B" but the value of the cost1 of "B" is lesser than that of "A". Thus, the dominance relation is not valid for "A" to "D". The non-dominated solution that is a solution not dominated by other solutions in the solution space is called "a pareto optimal solution". Then, a curve A (a curved surface in the n-dimensional space ("n" is equal to or greater than "3") connecting the pareto optimal solutions is called "a pareto curve" (or "a pareto curved surface").

Figure 10:
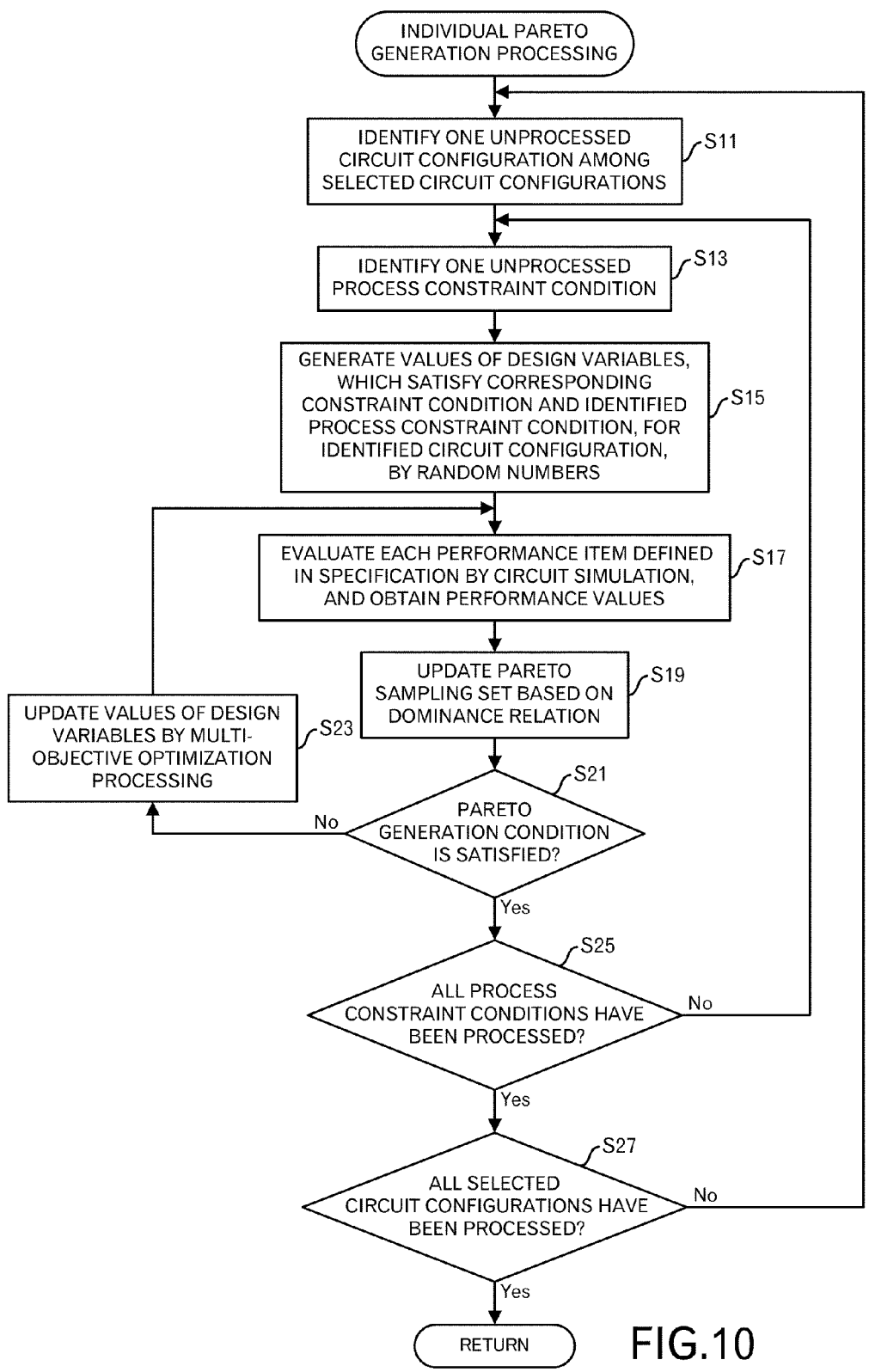
FIG. 10 is a diagram depicting a processing flow of an individual pareto generation processing.

Under such a presupposition, the individual pareto generation processing will be explained according to FIG. 10. First, the individual pareto generation unit 8 identifies one unprocessed circuit configuration among the selected circuit configurations stored in the selected circuit configuration data storage 5 (step S11). Moreover, the individual pareto generation unit 8 identifies one unprocessed process constraint condition among plural process constraint conditions stored in the process constraint condition storage 13 (step S13).

Then, the individual pareto generation unit 8 generates, for the identified circuit configuration, values of the design variables satisfying corresponding constraint condition of the identified circuit configuration, which is stored in the constraint condition storage 1, and values of the design variables (i.e. circuit parameters including, for example, the gate length L and gate width W), which satisfy the identified process constraint condition, by using the random numbers, and stores the values into a storage device such as a main memory (step S15).

Then, the individual pareto generation unit 8 reads out data of the peripheral circuits used for the circuit simulation for the identified circuit configuration from the test bench data storage 7, outputs the read data of the peripheral circuits, data of the identified circuit configuration, which is stored in the selected circuit configuration data storage 5, the values of the design variables, which are generated at the step S15, and the respective items (i.e. performance items) in the requirement specification, which are stored in the specification data storage 3, to the circuit simulator 9, causes the circuit simulator 9 to evaluate the respective performance items defined in the requirement specification, obtains performance values of the respective performance items defined in the requirement specification from the circuit simulator 9, and stores the obtained values into the storage device such as the main memory (step S17).

Figure 11:
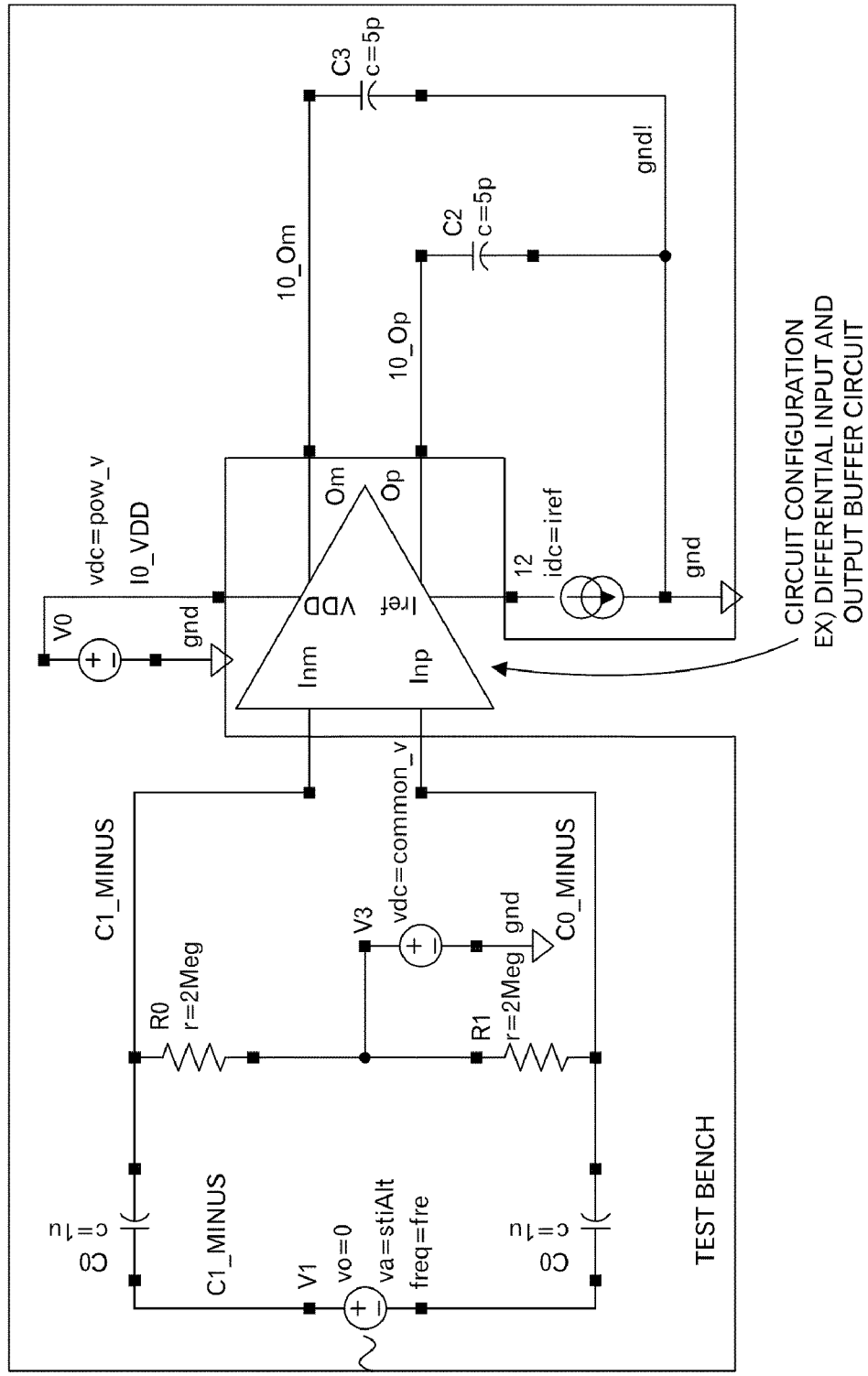
FIG. 11 is a diagram schematically depicting an example of data stored in a test bench data storage.

FIG. 11 depicts an example of data of the peripheral circuit, which is read out from the test bench data storage 7. In the example of FIG. 11, a differential input and output buffer circuit, which is the identified circuit configuration, is depicted in the center, and circuits required for the measurements of the performance items and a power supply circuit are connected to a power supply terminal, input and output terminals and the like for the differential input and output buffer circuit. Such peripheral circuits are well-known, and further explanation is omitted.

In addition, processing contents of the circuit simulation is also well-known, and further explanation is omitted.

After that, the individual pareto generation unit 8 judges, by confirming the dominance relation with the respective pareto optimal solutions selected prior to this step, whether or not a set of performance values for the respective performance items, which are obtained at the step S17, constitutes a pareto optimal solution in the solution space, and updates a pareto sampling set based on the judgment result (step S19). Namely, when a solution constituted by the set of performance values for the respective performance items, which are obtained at the step S17, dominates another solution, the individual pareto generation unit 8 excludes another solution from the pareto sampling set that is a set of the pareto optimal solutions, adds the solution obtained at the step S17 to the pareto sampling set. On the other hand, when the solution obtained at the step S17 is dominated by another solution, the solution obtained at the step S17 is discarded.

The pareto sampling set is stored into the individual pareto data storage 10 as data as depicted in FIG. 12. In an example of FIG. 12, a table stores an identifier of the circuit configuration, an identifier of the applied process constraint condition, values of the design values 1 to 3 and values of the performance items 1 to 4. The number of variables and the number of items are mere examples, and may be greater than those in FIG. 12. Thus, data for one pareto optimal solution is registered as one record. Then, records for a combination of one circuit configuration and one process constraint condition constitute the pareto sampling set.

After that, the individual pareto generation unit 8 judges whether or not the pareto generation conditions stored in the pareto generation condition storage 6 are satisfied (step S21). The pareto generation conditions are execution conditions in the multi-objective optimization processing method (i.e. a method for simultaneously investigating tradeoff among plural objective functions), and when the genetic multi-objective optimization algorithm NSGA-II (Non-dominate Sorting Genetic Algorithm II) is used, the number of generations that a population evolves, the population and the like are designated as the pareto generation condition. Incidentally, the multi-objective optimization itself, especially NSGA-II, is well-known, and various documents are disclosed.

When the pareto generation conditions are not satisfied, the individual pareto generation unit 8 updates the values of the design variables by the aforementioned well-known multi-objective optimization processing (e.g. a crossover processing or mutation processing) and stores the updated values into the storage device such as the main memory (step S23). Then, the processing returns to the step S17.

On the other hand, when the pareto generation conditions are satisfied, the individual pareto generation unit 8 judges whether or not all of process constraint conditions stored in the process constraint condition storage 13 have been processed (step S25). When at least one unprocessed process constraint condition exists, the processing returns to the step S13. On the other hand, when there is no unprocessed process constraint condition, the individual pareto generation unit 8 judges whether or not all selected circuit configurations have been processed (step S27). When at least one unprocessed selected circuit configuration exists, the processing returns to the step S11. On the other hand, when no unprocessed selected circuit configuration exists, the processing returns to the calling-source processing.

Figure 13:
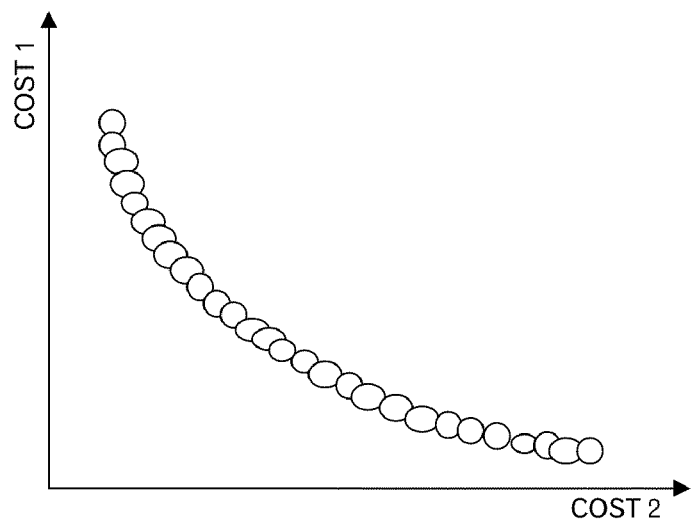
FIG. 13 is a diagram schematically depicting a pareto sampling set.
Figure 14:
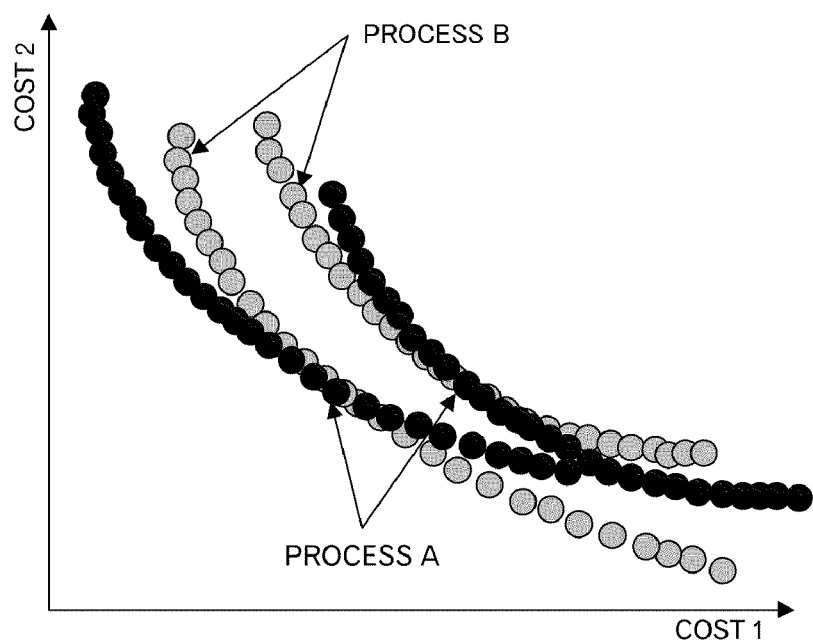
FIG. 14 is a schematic diagram depicting the pareto sampling set generated by the individual pareto generation processing.

By carrying out such a processing, a set of pareto optimal solutions is generated for each combination of the selected circuit configuration and the process constraint condition. When schematically depicting the solution space as the two-dimensional space, plural solutions constituting the pareto curve as depicted in FIG. 13 are obtained for one combination of the circuit configuration and the process constraint condition. In addition, when carrying out the processing in FIG. 10, the same number of pareto curves as the number of process constraint conditions are generated for one circuit configuration. Therefore, when there are two circuit configurations and two process constraint conditions A and B (also simply described as "process A" and "process B".), 4 pareto curves are generated as depicted in FIG. 14. In FIG. 14, two sets of black circles represent the pareto curves of the process A for the first and second circuit configurations, and two sets of hatched circles represent the pareto curves of the process B for the first and second circuit configurations.

Figure 8:
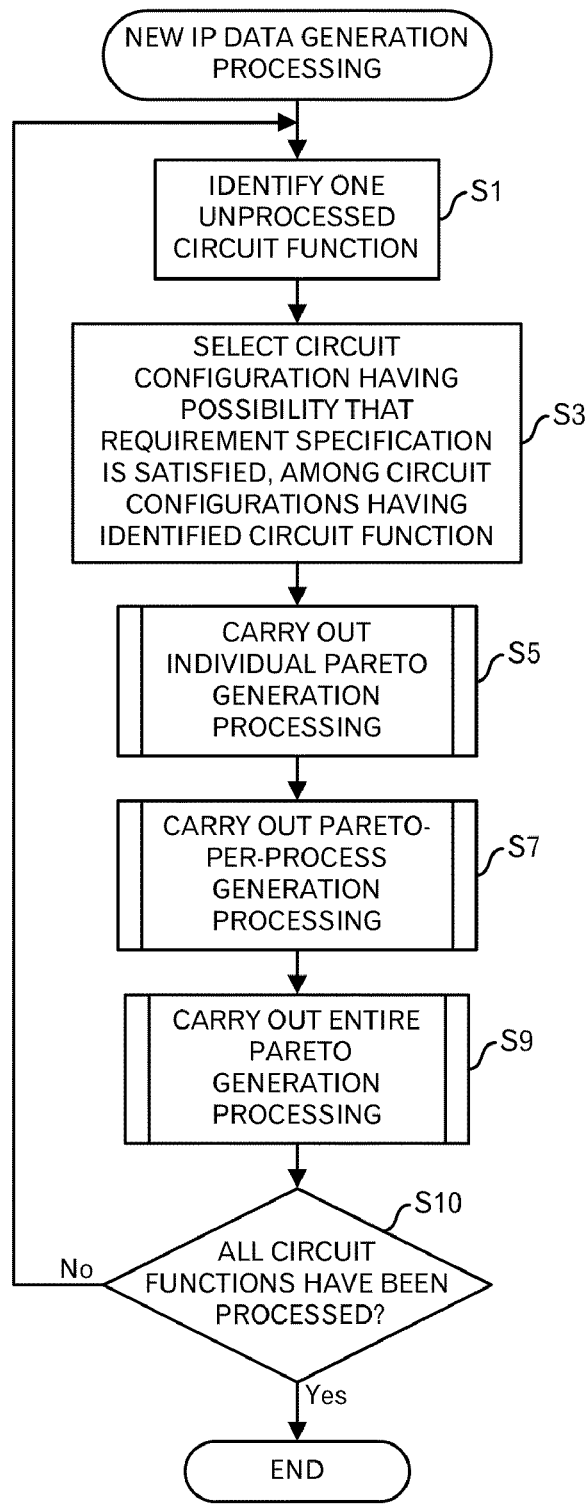
FIG. 8 is a diagram depicting a processing flow of a new IP data generation processing in the embodiment of this technique.

Returning to the explanation of the processing in FIG. 8, the pareto-per-process generation unit 14 carries out an entire pareto generation processing (step S7). This pareto-per-process generation processing will be explained by using FIGS. 15-20.

Incidentally, the pareto-per-process generation processing is a processing to superpose the pareto sampling sets for each of the process constraint conditions to constitute a set of pareto optimal solutions for the each of the process constraint conditions. Thus, either of two methods may be adopted, one is a method for confirming the mutual dominance relations for all pareto optimal solutions for all of the selected circuit configurations and discretely generating a set of pareto optimal solutions for each of the process constraint conditions, and the other is a method for identifying the pareto optimal solutions for each of the process constraint conditions by modeling the pareto sampling sets for each of the selected circuit configurations, which were calculated for the same process constraint condition, by the mathematical expressions, and mathematically analyzing the dominance relation between the mathematical expressions.

Figure 15:
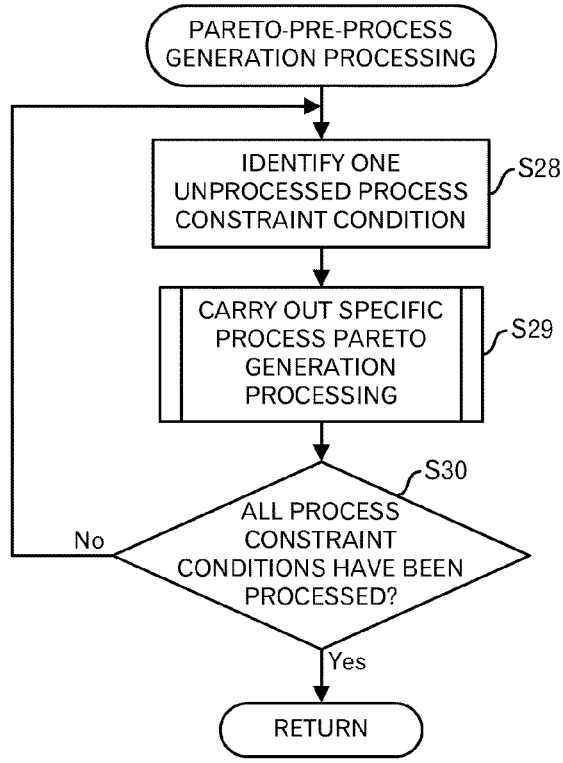
FIG. 15 is a diagram depicting a processing flow of a pareto-per-process generation processing.

Here, the former will be explained. First, the pareto-per-process generation unit 14 identifies one unprocessed process constraint condition among the process constraint conditions registered in the individual pareto data storage 10 (or the process constraint condition storage 13) (FIG. 15: step S28). Then, the pareto-per-process generation unit 14 carries out a specific process pareto generation processing (step S29). This specific process pareto generation processing will be explained by using FIGS. 16 to 20.

Figure 16:
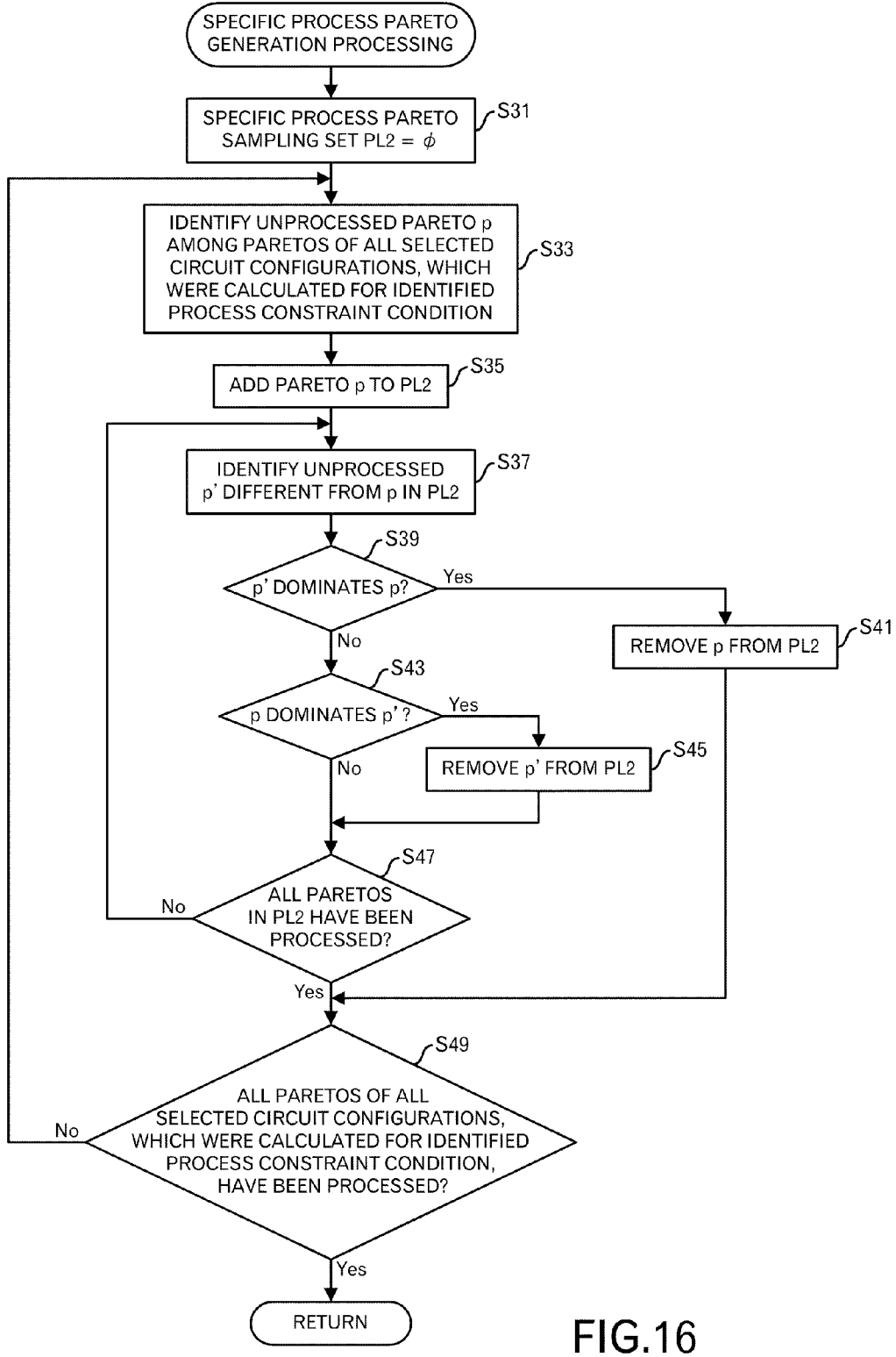
FIG. 16 is a diagram depicting a processing flow of a specific process pareto generation processing.

First, the pareto-per-process generation unit 14 sets the specific process pareto sampling set PL2=φ (FIG. 16: step S31). The set PL2 is stored in the pareto-per-process data storage 15. Then, the pareto-per-process generation unit 14 identifies one unprocessed pareto optimal solution p among the pareto optimal solutions for all of the selected circuit configurations, which were calculated for the identified process constraint condition (step S33). After that, the pareto-per-process generation unit 14 adds the pareto optimal solution p to the set PL2 (step S35).

Furthermore, the pareto-per-process generation unit 14 identifies one unprocessed optimal solution p' different from p among the set PL2 (step S37). Then, the pareto-per-process generation unit 14 judges whether or not "p' dominates p" is satisfied (step S39). When "p' dominates p" is satisfied, the pareto-per-process generation unit 14 removes p from the set PL2, because p does not constitute the pareto optimal solution for all of the selected circuit configurations (step S41). Then, the processing shifts to step S49. On the other hand, "p' dominates p" is not satisfied, the pareto-per-process generation unit 14 judges whether or not "p dominates p'" is satisfied (step S43). When "p dominates p'" is satisfied, the pareto-per-process generation unit 14 removes p' from the set PL2, because p' is unnecessary (step S45). Then, the processing shifts to step S47. Also in case where "p dominates p'" is not satisfied, the processing shifts to the step S47.

Figure 17:
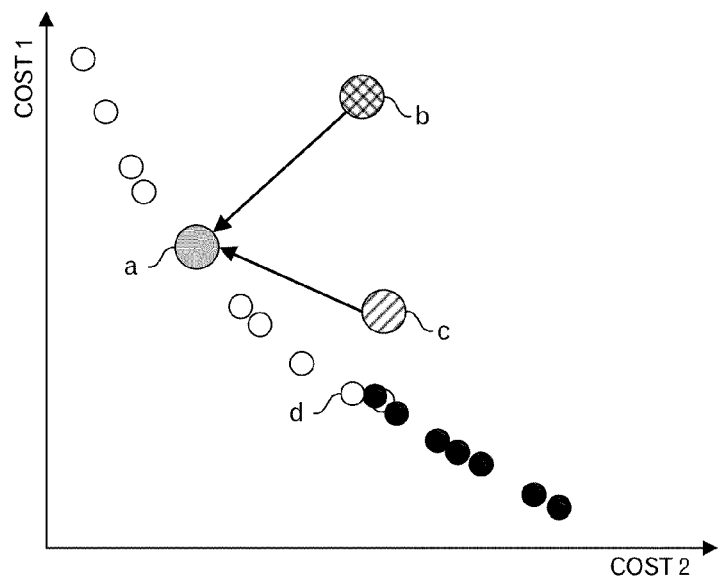
FIG. 17 is a schematic diagram to explain the pareto-per-process generation processing.

As depicted in FIG. 17, when p corresponds to "a" in FIG. 17 and p' corresponds to "b" in FIG. 17, "a dominates b" is satisfied. Therefore, "b" in FIG. 17 is removed from the set PL2. On the other hand, when p' corresponds to "c", "a dominates c" is not satisfied. Therefore, "c" remains in the set PL2. However, for example, when p corresponds to "d" in FIG. 17, "d dominates c" is satisfied. Therefore, "c" is removed from the set PL2. Basically, even when p corresponds to "b" and p' corresponds to "a", the similar operation is carried out.

After that, the pareto-per-process generation unit 14 judges whether or not all of the pareto optimal solutions in the set PL2 have been processed (step S47). When all of the pareto optimal solutions in the set PL2 have not been processed, the processing returns to the step S37. On the other hand, when all of the pareto optimal solutions in the set PL2 have been processed, the pareto-per-process generation unit 14 judges whether or not all of the pareto optimal solutions for all of the selected circuit configurations, which were calculated for the identified process constraint condition, have been processed (step S49). When at least one unprocessed pareto optimal solution exists, the processing returns to the step S33. When all of the pareto optimal solutions have been processed, the processing returns to the calling-source processing.

Figure 18:
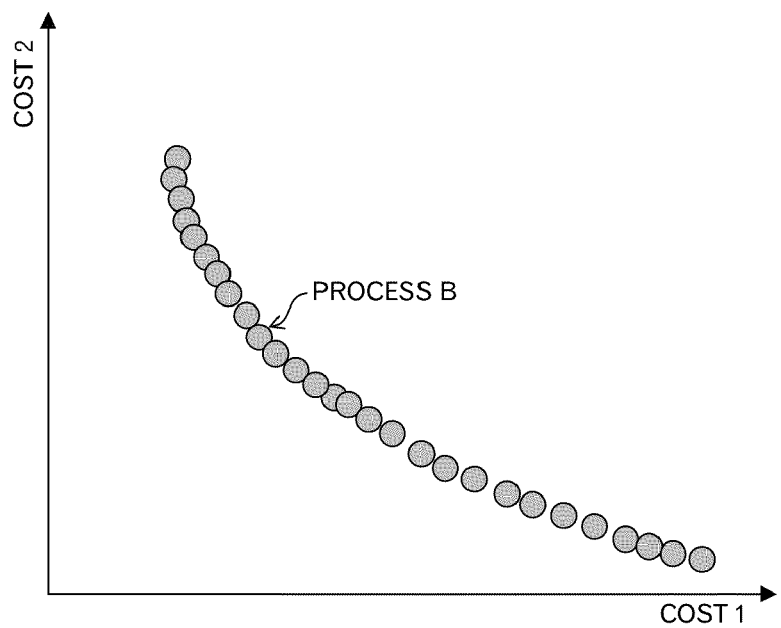
FIG. 18 is a schematic diagram to explain the pareto-per-process generation processing.

For example, when leaving only the non-dominated solutions by carrying out the process in FIG. 16 for the process B depicted in FIG. 14, the pareto sampling set as depicted in FIG. 18 is obtained. In case of the process B, a curve closer to the lower left in the two-dimensional solution space as depicted in FIG. 18 is selected.

In addition, the pareto-per-process data storage 15 stores data as depicted in FIG. 19. Only records corresponding to the pareto optimal solutions identified in the processing flow of FIG. 16 are included in FIG. 19 among the records as depicted in FIG. 12. Namely, one record includes the identifier of the circuit configuration, the identifier of the process constraint condition, the values of the design variables 1 to 3 and the values of the performance items 1 to 4. Incidentally, although only records for the process A of the process constraint condition are merely depicted, records for other processes are also stored, separately.

Returning to the explanation of the processing in FIG. 15, the pareto-per-process generation unit 14 judges whether or not all of the process constraint conditions registered in the individual pareto data storage 10 have been processed (step S30). When at least one unprocessed process constraint condition exists, the processing returns to the step S28. On the other hand, when all of the process constraint conditions have been processed, the processing returns to the calling-source processing.

Figure 20:
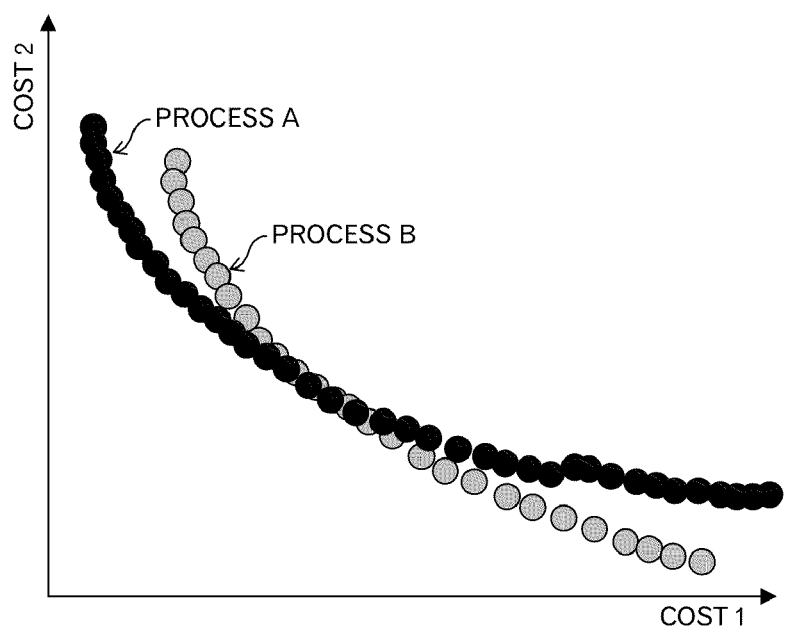
FIG. 20 is a schematic diagram to explain the pareto-per-process generation processing.

By carrying out such a processing, two pareto sampling sets as depicted in FIG. 20 are obtained by carrying out the processing in FIG. 15 for the pareto sampling sets for the processes A and B depicted in FIG. 14. The pareto optimal solutions included in the respective pareto sampling sets are pareto optimal solutions for any one of the selected circuit configurations.

Returning to the explanation of the processing in FIG. 8, the entire pareto generation unit 11 carries out an entire pareto generation processing (step S9). This entire pareto generation processing will be explained by using FIGS. 21-24.

Incidentally, the entire pareto generation processing is a processing to superpose the pareto sampling sets for each combination of the selected circuit configuration and the process constraint condition to constitute a set of pareto optimal solutions for all combinations of the selected circuit configuration and the process constraint condition. Thus, either of two methods may be adopted, one is a method for confirming the mutual dominance relations for all pareto optimal solutions included in the respective combinations of the selected circuit configuration and the process constraint condition and discretely generating a set of pareto optimal solutions for all combinations, and the other is a method for identifying the pareto optimal solutions for all combinations of the selected circuit configuration and the process constraint condition by modeling the pareto sampling sets for the respective combinations of the selected circuit configuration and the process constraint condition by the mathematical expressions and mathematically analyzing the dominance relation between the mathematical expressions.

Here, the former will be explained. First, the entire pareto generation unit 11 sets the entire pareto sampling set PL1=ϕ (step S231). The set PL1 is stored in the entire pareto data storage 12. Then, the entire pareto generation unit 11 identifies one unprocessed pareto optimal solution p among the pareto optimal solutions for all of the selected circuit configurations and all of the process constraint conditions (step S233). After that, the entire pareto generation unit 11 adds the pareto optimal solution p to the set PL1 (step S235).

Furthermore, the entire pareto generation unit 11 identifies one unprocessed optimal solution p' different from p among the set PL1 (step S237). Then, the entire pareto generation unit 11 judges whether or not "p' dominates p" is satisfied (step S239). When "p' dominates p" is satisfied, the entire pareto generation unit 11 removes p from the set PL1, because p does not constitute the pareto optimal solution for all of the selected circuit configurations and all of the process constraint conditions (step S241). Then, the processing shifts to step S249. On the other hand, "p' dominates p" is not satisfied, the entire pareto generation unit 11 judges whether or not "p dominates p'" is satisfied (step S243). When "p dominates p'" is satisfied, the entire pareto generation unit 11 removes p' from the set PL1, because p' is unnecessary (step S245). Then, the processing shifts to step S247. Also in case where "p dominates p'" is not satisfied, the processing shifts to the step S247. The processing from the step S237 to the step S245 is the same as the processing explained by using FIG. 17.

After that, the entire pareto generation unit 11 judges whether or not all of the pareto optimal solutions in the set PL1 have been processed (step S247). When all of the pareto optimal solutions in the set PL1 have not been processed, the processing returns to the step S237. On the other hand, when all of the pareto optimal solutions in the set PL1 have been processed, the entire pareto generation unit 11 judges whether or not all of the pareto optimal solutions for all of the selected circuit configurations and all of the pareto constraint conditions have been processed (step S249). When at least one unprocessed pareto optimal solution for all of the selected circuit configurations and all of the process constraint conditions exists, the processing returns to the step S233. When all of the pareto optimal solutions have been processed, the processing returns to the calling-source processing.

Figure 21:
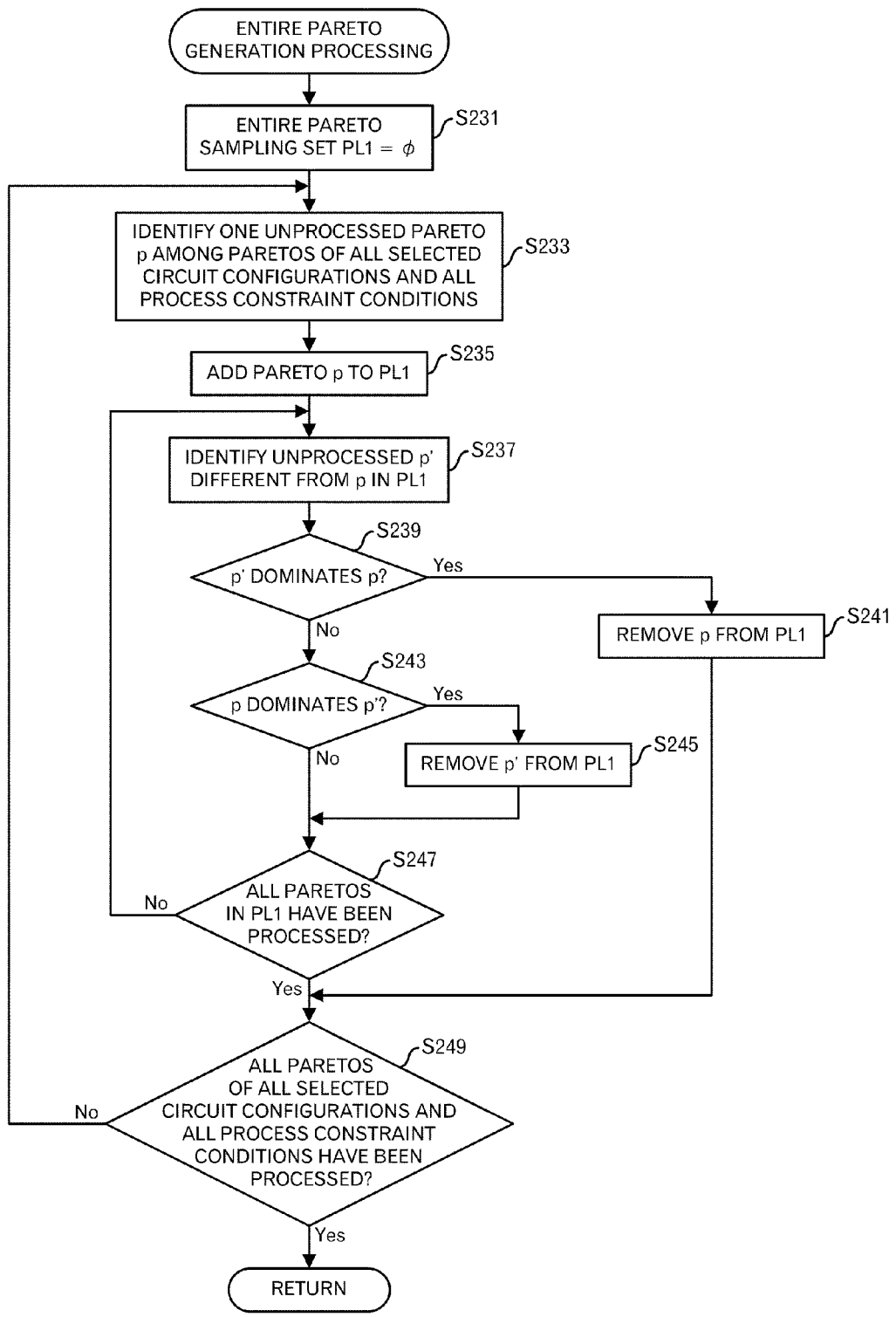
FIG. 21 is a diagram depicting a processing flow of an entire pareto generation processing.
Figure 22:
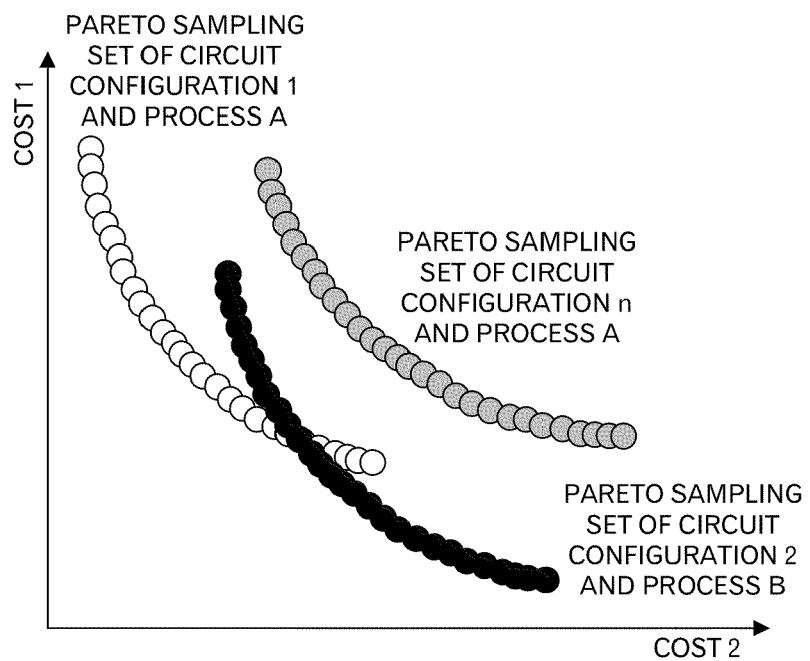
FIG. 22 is a schematic diagram to explain the entire pareto generation processing.
Figure 23:
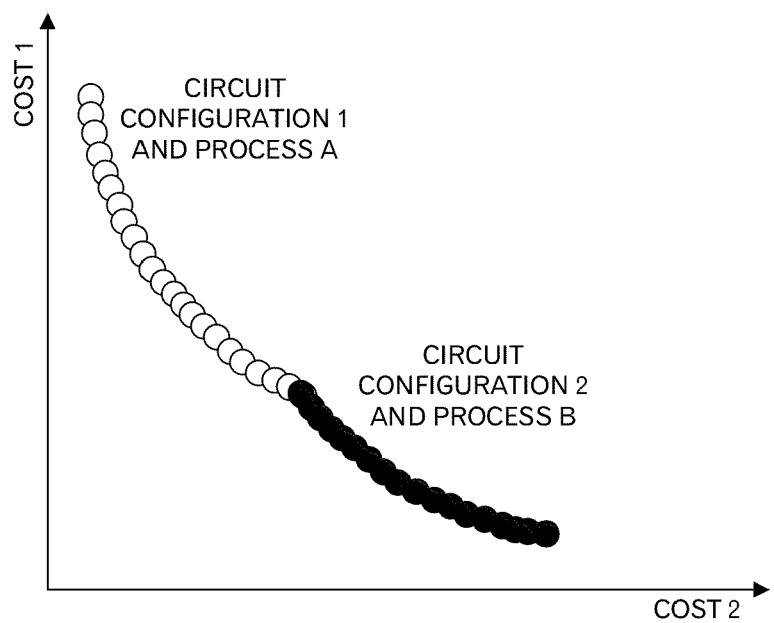
FIG. 23 is a schematic diagram to explain the entire pareto generation processing.

For example, as depicted in FIG. 22, the two-dimensional space is presupposed for the solution space, and when there are a pareto sampling set for the circuit configuration 1 and the process A, a pareto sampling set for the circuit configuration 2 and the process B and a pareto sampling set for the circuit configuration n and the process A, non-dominated solutions are left by carrying out the processing depicted in FIG. 21. Then, as depicted in FIG. 23, a portion of the pareto optimal solutions for the circuit configuration 1 and the process A and a portion of the pareto optimal solutions for the circuit configuration 2 and the process B constitute the pareto sampling set for all of the selected circuit configurations and all of the process constraint conditions.

In addition, the entire pareto data storage 12 stores data as depicted in FIG. 24. Only records corresponding to the pareto optimal solutions for all of the selected circuit configurations and all of the process constraint conditions are also included in FIG. 24 from among the records as depicted in FIG. 12. Namely, one record includes the identifier of the circuit configuration, the identifier of the process constraint condition, the values of the design variables 1 to 3 and the values of the performance items 1 to 4.

Returning to the explanation of the processing in FIG. 8, for example, the circuit configuration selection unit 4 judges whether or not all of the circuit functions designated in the designated function data stored in the specification data storage 3 have been processed (step S10). When at least one unprocessed circuit function exists, the processing returns to the step S1. On the other hand, when all of the designated circuit functions have been processed, the processing is completed.

When the aforementioned processing is carried out, the optimal pareto sampling set can be obtained in the entire pareto space, and when a specific process constraint condition is selected, the optimal pareto sampling set can be obtained for the specific process constraint condition.

The data stored in the pareto-per-process data storage 15 and the entire pareto data storage 12 is data, which is included in the new analog IP data 300 but is not included in the conventional data. The new analog IP data 300 may include the data stored in the circuit configuration library storage 2 and the test bench data storage 7 in addition to the aforementioned data.

Although it takes a relatively long time for the aforementioned processing because the calculation amount is relatively large, the generation of the new analog IP data 300 is not carried out at a time of the circuit design by the user who actually conducts the circuit design. Namely, other persons prepare the new analog IP data 300 in advance. Therefore, it is unnecessary for the user who actually conducts the circuit design to consider the calculation time to generate the new analog IP data 300.

Next, the automatic optimum circuit design apparatus 200 depicted in FIG. 1 will be explained by using FIG. 25. The automatic optimum circuit design apparatus 200 has (A) a process constraint condition storage 24 storing the respective process constraint conditions used when generating data stored in the pareto-per-process data storage 15 and the entire pareto data storage 12; (B) an input unit 21 that displays data stored in the process constraint condition storage 24 to the user who actually carries out the circuit design and accepts inputs and designation from the user; (C) a specification data storage 22 storing specification data of a circuit to be designed, which was accepted by the input unit 21 from the user; (D) a pareto data storage 25 storing data stored in the pareto-per-process data storage 15 and the entire pareto data storage 12; (E) a circuit configuration library storage 23 storing data of the circuit configurations corresponding to the identifiers of the circuit configurations, which are included in the data stored in the pareto data storage 25; (F) a test bench data storage 24 storing the same data as the data stored in the test bench data storage 7; (G) an optimal solution generation unit 27 that carries out a processing by using data stored in the specification data storage 22, the circuit configuration library storage 23, the pareto data storage 25 and the test bench data storage 26 according to instructions from the input unit 21; (H) a circuit simulator 29 that carries out a well-known circuit simulation; (I) an optimal data storage 28 storing processing results of the optimal solution generation unit 27; and (J) an output unit 30 that outputs data stored in the optimal solution data storage 28 to the user through an output device such as a display device or printer. Incidentally, the circuit simulator 29 may be implemented as a different apparatus from the automatic optimum circuit design apparatus 200.

Data completely identical with data stored in the process constraint condition storage 13 is not stored in the process constraint condition storage 24, but data to display conditions for judging which of processes should be selected, to the user who actually carries out the circuit design is stored in the process constraint condition storage 24. Therefore, the characteristic portions may be included without the detailed process constraint conditions.

Figure 26:
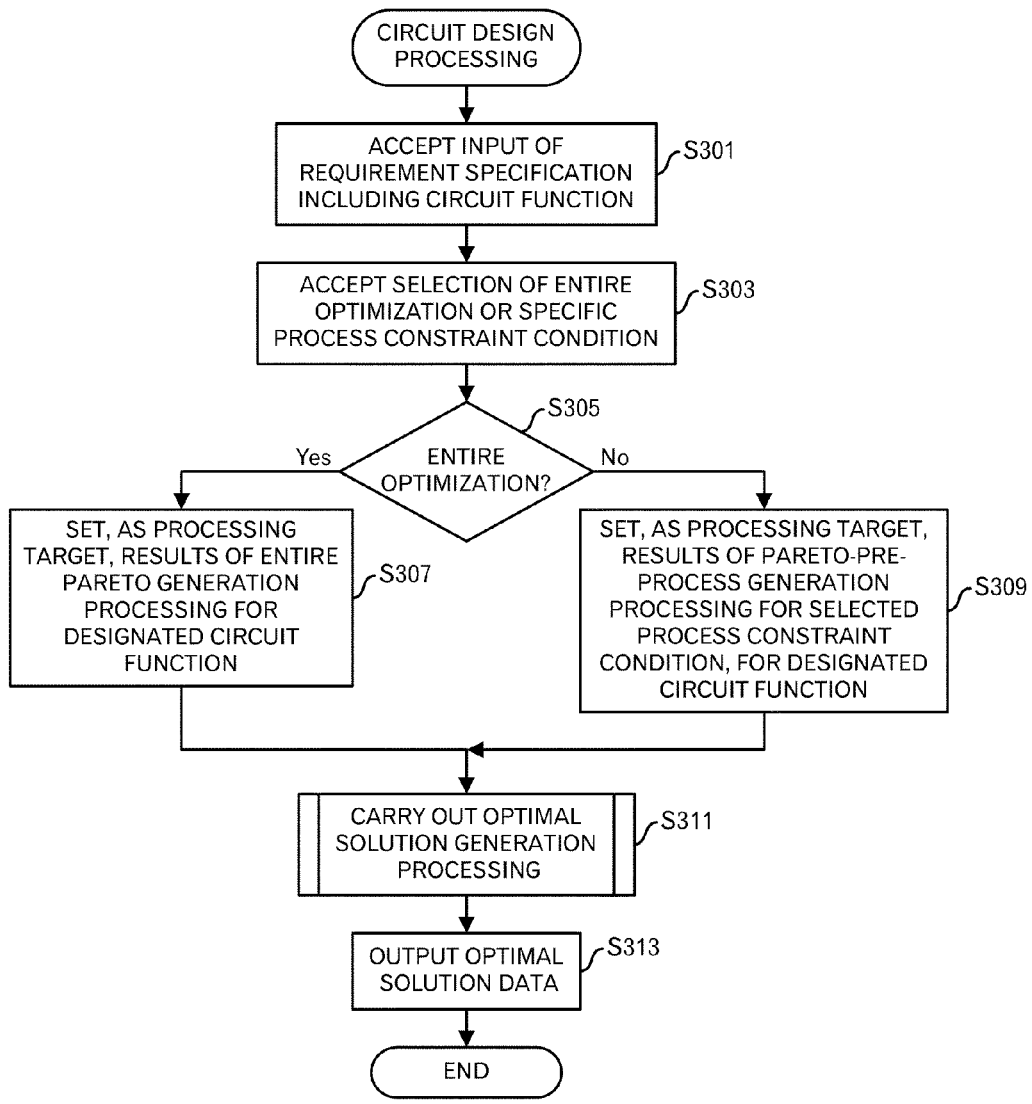
FIG. 26 is a diagram depicting a processing flow of a circuit design processing.
Figure 27:
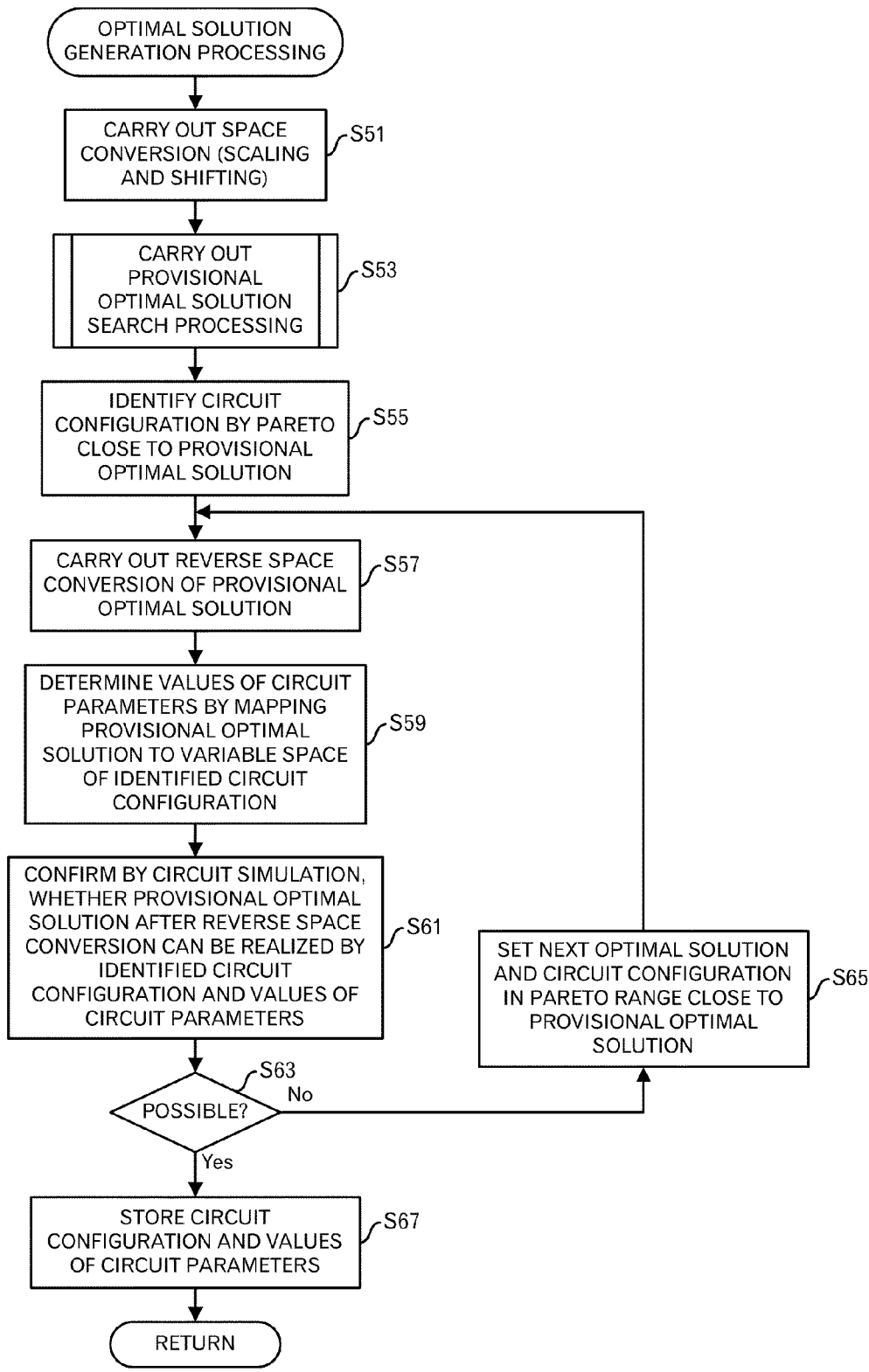
FIG. 27 is a diagram depicting a processing flow of an optimal solution generation processing.

Next, an operation of the automatic optimum circuit design apparatus 200 will be explained by using FIGS. 26 to 30. First, the input unit 21 prompts the user to input requirement specification including a function of the circuit to be designed from now, accepts data of the requirement specification including the function of the circuit from the user and stores the input data into the specification data storage 22 (FIG. 26: step S301). Incidentally, the designation is carried out within a range of the requirement specification, which is a basis of the data stored in the pareto data storage 25.

Next, the input unit 21 prompts the user to select one optimization case among two optimization cases, accepts a selection result from the user (step S303), and outputs the selection result to the optimal solution generation unit 27. The first optimization case (i.e. entire optimization) is a case where the circuit having the function designated by the user is optimized among the all process constraint conditions, and the second optimization case is a case where any one of the process constraint condition is selected, and the circuit having the function designated by the user is optimized under this selected process constraint condition.

Then, the optimal solution generation unit 27 judges whether or not the entire optimization is designated through the input unit 21 (step S305). When the entire optimization is designated, the optimal solution generation unit 27 sets, as the processing target, the processing result (FIG. 24) of the entire pareto generation processing, which is stored in the pareto data storage 25 for the designated circuit function stored in the specification data storage 22 (step S307). Then, the optimal solution generation unit 27 carries out an optimal solution generation processing according to this setting (step S311).

On the other hand, when a specific process constraint condition, not the entire optimization, is selected, the optimal solution generation unit 27 sets, as the processing target, the result (FIG. 19) of the pareto-per-process generation processing for the selected process constraint, which is stored in the pareto data storage 26 for the designated circuit function stored in the specification data storage 22 (step S309). Then, the optimal solution generation unit 27 carries out the optimal solution generation processing according to this setting (step S311).

The optimal solution generation processing will be explained by using FIGS. 27 to 30.

First, the optimal solution generation unit 27 carries out a space conversion (i.e. scaling and shifting) of the solution space so as to balance distribution of the values for each items in the requirement specification stored in the specification data storage 22 (step S51). Because the processing is carried out for each of the items in the requirement specification designated by the user, the item is a performance item stored in the pareto data storage 25, and this step is carried out every execution of the step S311. The processing results are stored, for example, into the optimal solution data storage 28. The data format is the same as the portion including the identifier of the circuit configuration, the identifier of the process constraint condition and the performance items 1 to 4, like in FIG. 19 or 24, for example.

For example, the distance between the requirement specification S and the pareto optimal solution P in the solution space is defined as follows:

$$\|S-P\| = \sqrt{(S_1-P_1)^2 + (S_2-P_2)^2 + \ldots + (S_n-P_n)^2} \quad (1)$$

In such a case, for example, when the consumed electric current as one of the performance items is about several micro A and the bandwidth as one of the performance items is about several GHz, the value of the consumed electric current is apparently smaller than the value of the bandwidth. Therefore, the consumed electric current is substantially ignored. In order to avoid such a situation and cause all of the performance items to be equivalently treated, the space conversion is carried out. Specifically, the Affine conversion as described below is carries out. Incidentally, $P_{Tran}$ represents a solution vector after the space conversion, $P_{samp}$ represents a solution vector (having n components. "n" is the number of performance items.) before the space conversion, $V_{Shift}$ represents a vector (having n components) for the parallel displacement, and $M_{scaling}$ represents a diagonal matrix (i.e. a matrix having n rows and n columns) to increase or decrease the values of the respective performance items in $P_{samp}$.

$$P_{Tran} = V_{shift} + M_{scaling} * P_{samp}$$

$$M_{scaling\_(i,j)} = \begin{cases} c_{i0}/(\max(obj_i) - \min(obj_i)) & (i = j) \\ 0 & (i \neq j) \end{cases}$$

$$V_{shift\_i} = M_{scaling\_(i,i)} * \min(obj_i)$$

Incidentally, $M_{scaling\_(i,j)}$ represents a component at i-th row and j-th column of $M_{scaling}$. In addition, $\max(obj_i)$ means the maximum value of the i-th performance item among all of the pareto optimal solutions set at step S307 or S309, and $\min(obj_i)$ means the minimum value of the i-th performance item among all of the pareto optimal solutions set at the step S307 or S309, similarly. Furthermore, $V_{shift\_i}$ represents the i-th component of $V_{shift}$. In addition, $c_{i0}$ is a constant designated for "i".

By carrying such a conversion, the space conversion so as to balance the respective performance items can be carried out. Namely, the respective performance items are almost equivalently treated.

Incidentally, when the distance is calculated, the same space conversion is required for the requirement specification S, naturally. By replacing $P_{samp}$ in the aforementioned expression with "S", the space conversion for the requirement specification S is conducted. The requirement specification after the space conversion is stored into the storage device such as the main memory.

Next, the optimal solution generation unit 27 carries out a provisional optimal solution search processing (step S53). This provisional optimal solution search processing will be explained by using FIG. 28.

Figure 28:
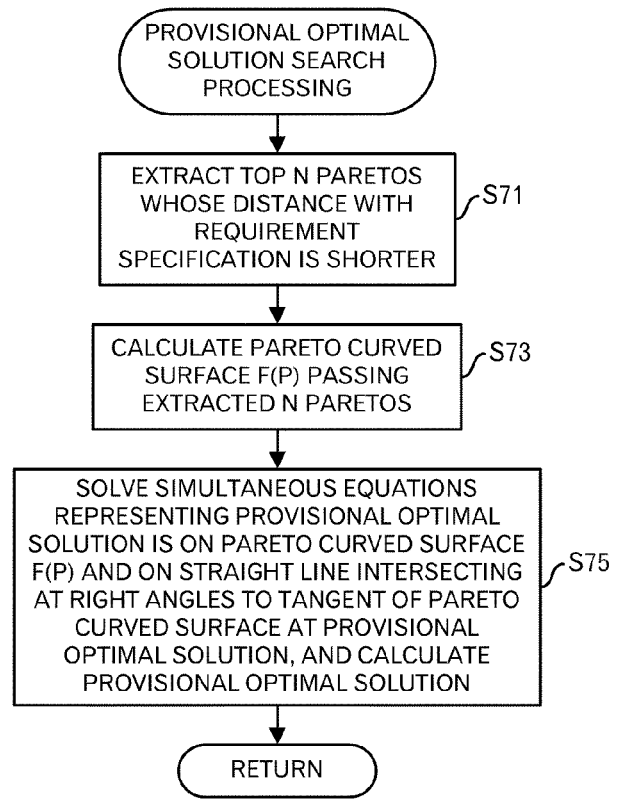
FIG. 28 is a diagram depicting a provisional optimal solution search processing.

First, the optimal solution generation unit 27 extracts top N pareto optimal solutions whose distance with the requirement solution is shorter, from among the pareto optimal solutions set at the step S307 or S309 (FIG. 28: step S71). Because the solutions after the space conversion are used, the distance is calculated by using the aforementioned expression (1). Then, the optimal solution generation unit 27 calculates a pareto curved surface F(P)=0 (in case of the two-dimensional space, a pareto curve) passing through the N extracted pareto optimal solutions by using a well-known method such as a method of least squares (step S73).

Then, the optimal solution generation unit 27 calculates the provisional optimal solution by solving simultaneous equations representing that the provisional optimal solution is on the pareto curved surface F(P)=0 and also on a straight line intersecting at right angles to a tangent of the pareto curve at the provisional optimal solution, and stores the provisional optimal solution into the storage device such as the main memory (step S75).

Figure 29:
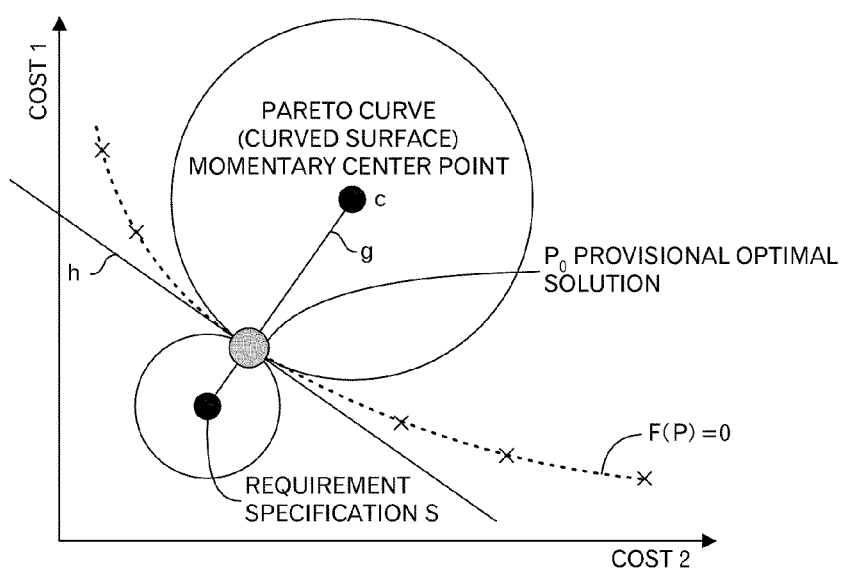
FIG. 29 is a diagram schematically depicting search of a provisional optimal solution.

The outline of this processing will be explained by using FIG. 29. As depicted in FIG. 29, when it is presupposed that a curve passing the N pareto optimal solutions extracted at the step S71 is the pareto curve F(P), the provisional optimal solution $P_0$ is on the pareto curve F(P)=0. Namely, F($P_0$)=0 is satisfied. Furthermore, according to Collinearity theorem, the requirement specification S, the provisional optimal solution $P_0$ and the momentary center point of the pareto curve (generally, a curved surface) are on the same straight line. Namely, the provisional optimal solution $P_0$ and the requirement specification S are on the straight line g intersecting at right angles to a tangent h of the pareto curved surface at the provisional optimal solution $P_0$.

Specifically, the relations are represented by the following equations.

$$\begin{cases} P_o = -\nabla F(P)|_{P=P_o} \times t + Spec \\ F(P_o) = 0 \end{cases}$$

The first term in the right side of the first equation is a vector representing the straight line g, and "t" is an unknown coefficient, and Spec corresponds to the requirement specification S. Namely, the first expression represents the provisional optimal solution $P_0$ is obtained by multiplying the straight line g from the requirement specification S by "t". When such simultaneous equations are solved, "t" and the provisional optimal solution $P_0$ are obtained. Then, the processing returns to the calling-source processing.

Incidentally, possibility that the provisional optimal solution $P_0$ is different from the solutions stored in the solutions set at the step S307 or S309 is high. Therefore, a following confirmation processing is carried out.

Namely, the optimal solution generation unit 27 extracts the pareto optimal solutions close to the provisional optimal solution from among the pareto optimal solutions set at the step S307 or S309, and determines the circuit configuration of the provisional optimal solutions based on the circuit configuration of the close pareto optimal solutions (step S55). Schematically depicting a case of the two dimensional space in FIG. 30, when the provisional optimal solution $P_0$ is obtained from the requirement specification S, the optimal solution generation unit 27 extracts the pareto optimal solutions $P_1$ and $P_2$ close to the provisional optimal solution $P_0$ (here, both sides of the provisional optimal solution on the pareto curve). Then, the optimal solution generation unit 27 identifies identifiers of the circuit configurations from data set at the step S307 or S309 and associated with the pareto optimal solutions $P_1$ and $P_2$. At this time, when the same identifier is obtained for both of the pareto optimal solutions $P_1$ and $P_2$, this circuit configuration is adopted. On the other hand, when the different identifiers are obtained, the circuit configuration of the pareto optimal solution closest to the provisional pareto optimal solution is adopted.

Then, the optimal solution generation unit 27 carries out a reverse space conversion of the provisional optimal solution (step S57). The reverse conversion of the space conversion carried out at the step S51 is carried out. Specifically, an inverse vector of $V_{shift}$ is subtracted from $P_{Tran}$, and the result is further multiplied by an inverse matrix of $M_{scaling}$ from the left. This is because it is used at step S61.

Then, the optimal solution generation unit 27 determines values of the circuit parameters by mapping the provisional optimal solution to the variable space of the identified circuit configuration, and stores the values into the storage device such as the main memory (step S59).

Specifically, the optimal solution generation unit 27 selects the N pareto optimal solutions near the requirement specification, and calculates a relational expression f of the circuit parameters and the performance (the performance values after the space conversion) by using these selected pareto optimal solutions. Namely, $p_k=f_k(x1, x2, \ldots, xn)$ is calculated. Here, "$p_k$" represents a performance value for the performance item k in the pareto optimal solution, and "xn" represents a value of the n-th circuit parameter in the pareto optimal solution. For example, "f" is calculated by fitting coefficients of the Taylor polynomial by using the method of least squares. Then, the circuit parameters X={x1, x2, \ldots, xn}, which can realize the provisional optimal solution $P_0$ are calculated by using this expression P=F(X). Incidentally, P={$p_1, \ldots, p_k$} and F={$f_1, \ldots, f_k$}.

Explaining the final processing in detail, because the number k of the performance item is typically less than the number n of the circuit parameters, a set of x1, x2, ..., xn cannot be obtained even by simply substituting the provisional optimal solution $P_0$ into the simultaneous equations $F=\{f_1, f_2, \ldots, f_k\}$. Therefore, an optimization algorithm (e.g. a well-known Nelder-Mead method (See R. Fletcher, Practical Methods of Optimization, John Wiley&Sons, 1991.)) is used to solve approximate x1, x2, ..., xn, which can realize the provisional optimal solution. This processing is used, for example, in Japanese Laid-open Patent Publication No. 2004-61372. Therefore, any further explanation is omitted.

After that, the optimal solution generation unit 27 outputs to the circuit simulator 29, data of the circuit configuration identified at the step S55, data of the peripheral circuits for the identified circuit configuration, which is stored in the test bench data storage 26, and the values of the circuit parameters, which are calculated at the step S59, to cause the circuit simulator 29 to carry out the well-known circuit simulation, and obtains the performance values of the respective performance items in the requirement specification from the circuit simulator 29. Then, the optimal solution generation unit 27 judges whether or not the provisional optimal solution after the reverse space conversion can be realized by the identified circuit configuration and circuit parameters (step S61). Namely, for each performance item in the requirement specification, the optimal solution generation unit 27 judges whether or not a value better than the value of the provisional optimal solution after the reverse space conversion is obtained in the circuit simulation. Namely, it is judged whether or not the cost lower than the cost of the provisional optimal solution after the reverse space conversion is obtained. The values of all of the performance items must be better than the corresponding performance values of the provisional optimal solution. Incidentally, the provisional optimal solution after the reverse space conversion is used, because the performance values of the provisional optimal solution should be compared with the results of the circuit simulation. When only comparing is executed, the results of the circuit simulation may be compared after the space conversion.

When the provisional optimal solution can be realized (step S63: Yes route), the optimal solution generation unit 27 stores the identified circuit configuration (e.g. only identifier of the identified circuit configuration may be stored) and the circuit parameters into the optimal data storage 28 (step S67). The provisional optimal solution after the reverse space conversion is also stored when it is compared with the requirement specification. Then, the processing returns to the calling-source processing.

Figures 30, 32:
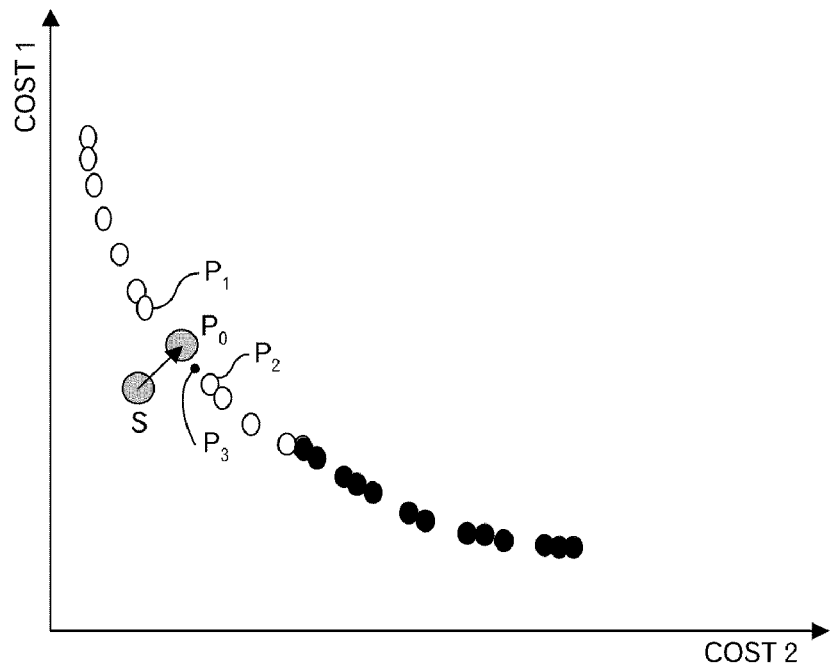
FIG. 30 is a schematic diagram to explain a processing to identify a circuit configuration corresponding to the provisional optimal solution.
FIG. 32 is a diagram depicting an example of data stored in a PVT corner setting data storage.

On the other hand, when it is judged that the provisional optimal solution cannot be realized (step S63: No route), the optimal solution generation unit 27 extracts a next optimal solution in a range of the pareto optimal solutions close to the provisional optimal solution identified at the step S55, and further sets the circuit configuration of the pareto optimal solution nearest to the next optimal solution as the circuit configuration of the next optimal solution (step S65). In the example of FIG. 30, $P_3$ between the pareto optimal solutions $P_1$ and $P_2$ is identified. However, when no other solution cannot be found between the pareto optimal solutions $P_1$ and $P_2$, the pareto optimal solution $P_1$ or $P_2$ is adopted. After that, the processing returns to the step S57.

Incidentally, the steps S57 to S61 may be skipped because data set at the step S307 or S309 can be used as it is, when the provisional optimal solution is the pareto optimal solution.

By carrying out such a processing, because the automatic optimum circuit design apparatus 200 carries out the circuit simulation whose processing time is longest, only at the step S61, the time consumed for the optimum circuit design can be largely reduced. In addition, even when it is judged at the step S63 that it is impossible to realize the requirement, it is possible to identify the circuit parameters for the solution (i.e. which substantially corresponds to the specification after the change) nearer to the required values of the performance items in the requirement specification by utilizing the pareto optimal solutions, which have already been calculated, again. Therefore, the processing time can be shortened.

Returning to the explanation of the processing in FIG. 26, the output unit 30 outputs data (e.g. circuit configuration the process constraint condition and the circuit parameters. Depending on the situation, the performance values of the respective performance items for the provisional optimal solution after the reverse space conversion may be outputted) of the optimal solution stored in the optimal solution data storage 28 to the output device such as the display device or printer (step S313). In this embodiment, by carrying out such a processing, even when the requirement specification cannot be satisfied, it becomes unnecessary to repeat the same processing after changing the requirement specification. Thus, the user can obtain the circuit configuration, the process constraint condition and circuit parameters to be adopted. Incidentally, when the provisional optimal solution is outputted, it becomes possible to judge the relation between the provisional optimal solution and the requirement specification. For example, it is possible to judge whether or not the provisional optimal solution satisfies the requirement specification. The output unit 30 may judge whether or not the provisional optimal solution satisfies the requirement specification and output the judgment result.

Second embodiment

Figure 31:
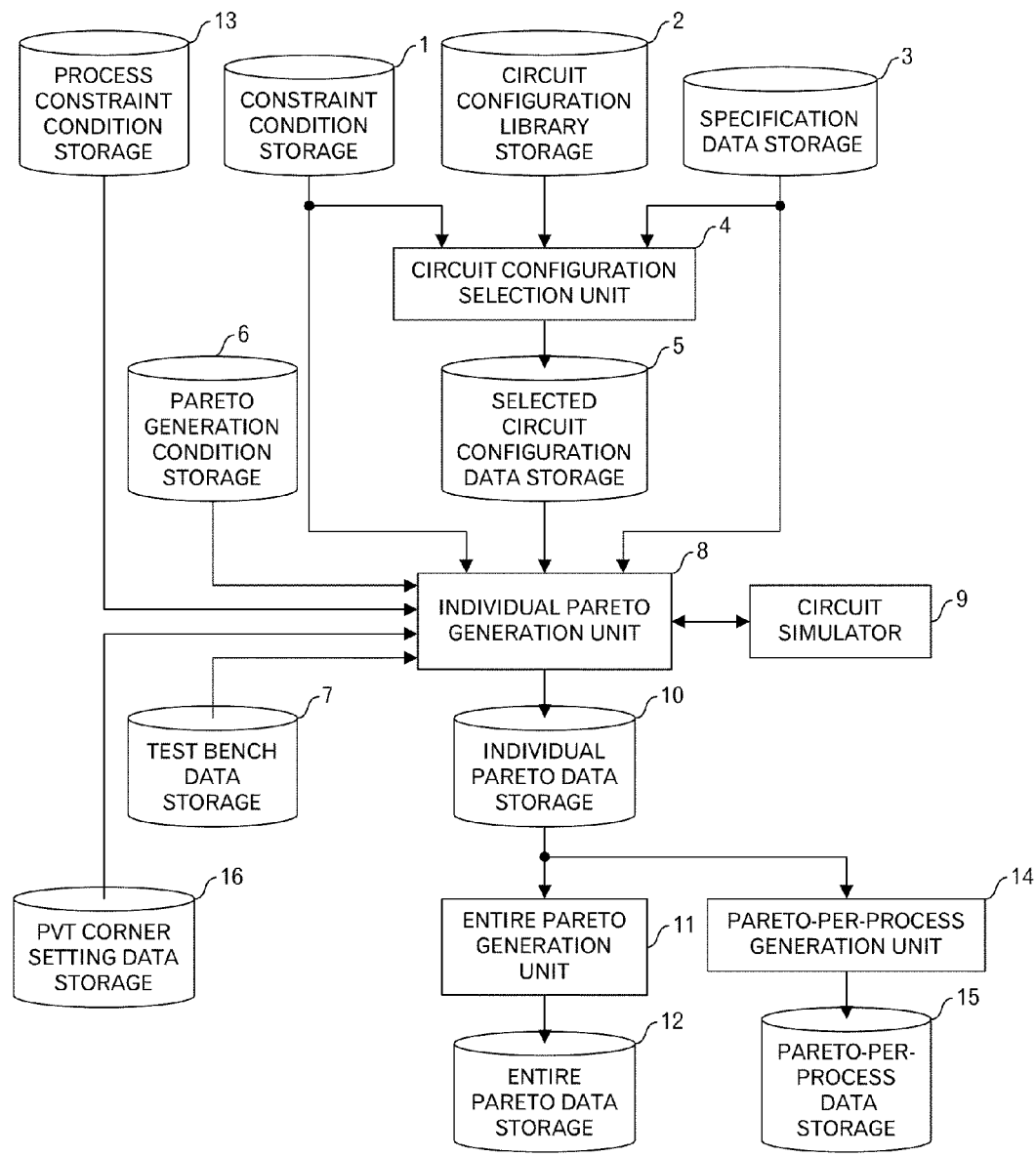
FIG. 31 is a functional block diagram of a new analog IP data generation apparatus in a second embodiment of this technique.

FIG. 31 depicts a functional block diagram of a new analog IP data generation apparatus 100 relating to the second embodiment of this technique. This new analog IP data generation apparatus 100 has (A) a circuit configuration library storage 2 storing circuit configuration data of analogue circuits, which has been designed but whose circuit parameters are not defined; (B) a constraint condition storage 1 storing constraint conditions (except the constraint conditions for the manufacturing processes) for the respective circuit configurations; (C) a specification data storage 3 storing specification data of requirement specification for the new analog IP data 300; (D) a process constraint condition storage 13 storing plural process constraint conditions having possibility that the process constraint condition is adopted at the circuit design; (E) a circuit configuration selection unit 4, which selects the circuit configurations having possibility that the requirement specification is satisfied, by using data stored in the constraint condition storage 1, the circuit configuration library storage 2 and the specification data storage 3; (F) a selected circuit configuration data storage 5 storing data for the circuit configuration data selected by the circuit configuration selection unit 4; (G) a pareto generation condition storage 6 storing pareto generation conditions; (H) a test bench data storage 7 storing data for peripheral circuits used for the simulation for each type of the circuit configuration, for instance; (I) a circuit simulator 9 such as Simulation Program with Integrated Circuit Emphasis (SPICE); (J) a PVT corner setting data storage 16 storing data to determine values of PVT (i.e. Process, Voltage and Temperature) corner setting items that may be changed due to factors other than the designer's intention; (K) an individual pareto generation unit 8 to cooperate with the circuit simulator 9 and to generate pareto optimal solutions for each combination of the selected circuit configuration and the process constraint condition by using data stored in the constraint condition storage 1, the selected circuit configuration data storage 5, the specification data storage 3, the pareto generation condition storage 6, the test bench data storage 7, the process constraint condition storage 13 and the PVT corner setting data storage 16; (L) an individual pareto data storage 10 storing processing results of the individual pareto generation unit 8; (M) an entire pareto generation unit 11 to generate paretos in all of the selected circuit configurations and all of the process constraint conditions by using data stored in the individual pareto data storage 10; (N) an entire pareto data storage 12 storing processing results by the entire pareto generation unit 11; (O) a pareto-per-process generation unit 14 to generate paretos for each of the process constraint conditions by using the data stored in the individual pareto data storage 10; and (P) a pareto-per-process data storage 15 storing data generated by the pareto-per-process generation unit 14.

In addition, the circuit simulator 9 may be implemented as an apparatus other than the new analog IP data generation apparatus 100.

Thus, a point that the PVT corner setting data storage 16 is newly introduced and is used by the individual pareto generation unit 8 is different from the first embodiment.

FIG. 32 depicts an example of data stored in the PVT corner setting data storage 16. Before specifically explaining FIG. 32, the PVT corner setting items will be explained. The PVT corner setting item is an item that can be set to the circuit simulator 9 and varies separately from the intention of the designer. In addition, the PVT corner setting items may include the same items as the design variables defined in the constraint conditions. Moreover, the PVT corner setting items may include items different from the design variables defined in the constraint conditions.

As described in the first embodiment, the constraint condition are the process constraint condition are conditions for the design variable that can be designated by the designer, and the value of the design variable may be designated as the range. However, even when it is judged that a specific value (e.g. 1 µm) is appropriate in the designated range and a chip is manufactured according to this specific value, a different value such as 1.07 µm or 95 nm from the specific value "1 µm" may be actually realized. Similarly, even when a chip is manufactured presupposing the temperature condition is 25 degrees, an actual operation temperature may become 30 degrees. Also as for the operation voltage, even when 1.5 V is designated as an appropriate voltage, 1.3 V may be supplied in the actual operation environment. Thus, item names, data to define fluctuation ranges and the like are stored in the PVT corner setting data storage 16 for the items whose value varies separately from the intention of the designer.

FIG. 32 depicts an example of data used in a case where a corner simulation described later is carried out. In an example of FIG. 32, for each of the PVT corner setting items, the minimum value (MIN), the representative value (e.g. average or median) (TYP) and the maximum (MAX) are registered. In the corner simulation, basically, the circuit simulation is carried out for all combinations of the setting values of the respective items. Therefore, because the number of combinations exponentially increases as the number of items increases, and the processing load also increases, the number of combinations may be decreased by setting, for example, only the representative values for the items having less influence or items having a narrow fluctuation range. In a case of FIG. 32, only the representative value is set for the item "PolyCD".

In addition, FIG. 33 depicts another example of data used in a case where the corner simulation is carried out. In an example of FIG. 33, for each of the PVT corner setting items, appearance range data of the value of the item and combination information are registered. The appearance range data is data representing the appearance distribution of the value of that PVT corner setting item. For example, the appearance distribution of the value of Tox is Gaussian distribution, and its average is $\mu_3$ and the variance is $\sigma_3$. For example, because cases equal to or greater than 99% are covered by a range from $(\mu_3-3\sigma_3)$ to $(\mu_3+3\sigma_3)$, $(\mu_3-3\sigma_3)$ is set as the lower limit value and $(\mu_3+3\sigma_3)$ is set as the upper limit value, as depicted in FIG. 34 in this embodiment. In addition, as for the voltage V, for example, the flat appearance distribution (i.e. uniform) is adopted, and an example that a value is determined in a range from (the median c−a %) to (the median c+b %) is depicted. The temperature is similarly defined. As for the combination information, as depicted in FIG. 32, in order to decrease the number of combinations, value types to be used for the combination are indicated. In an example of FIG. 33, in case of Leff, the combination information representing the upper limit value max and the lower limit value min are combined is registered. In addition, in the example of FIG. 33, in case of rshncd, the representative value typ is merely registered as the combination information.

Furthermore, FIG. 35 depicts an example of data used in a case where the Monte Carlo simulation is carried out. Although it is described below, when the Monte Carlo simulation is carried out, the random number is generated plural times for each of the PVT corner setting items, and the circuit simulation is carried out plural times for the combinations of the random numbers generated for the respective PVT corner setting items. In an example of FIG. 35, for each of the PVT corner setting items, the random number generation distribution data is registered. In the example of FIG. 35, the random number generation distribution for Leff is Gaussian distribution, and its average is $\mu_{11}$, and the variance is $\sigma_{11}$. In addition, in the example of FIG. 35, as for the voltage V and the temperature T, uniform distributions from (c−a %) to (c+b %) and from (f−d %) to (f+e %) are defined. According to these random number generation distribution data, the random number is generated and used for the pertinent item.

In this embodiment, basically, the processing of the individual pareto generation unit 8 is changed as described later. The presupposition that the PVT corner setting data storage 16 is used will be explained before explaining this processing.

Figure 36:
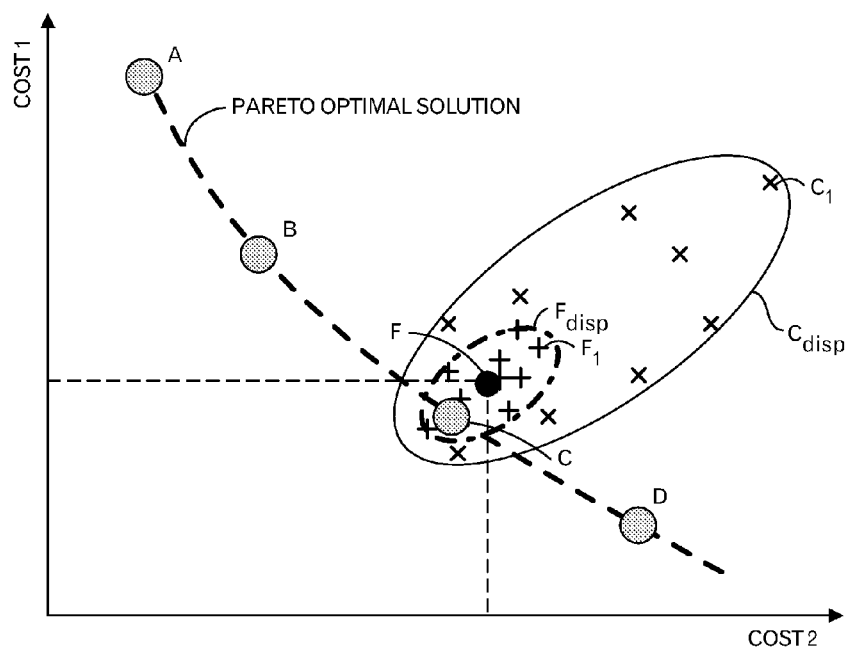
FIG. 36 is a diagram to explain problems when a pareto curve is formed for nominal values.

Although the pareto curve itself is depicted in FIG. 9, it is preferable to calculating the pareto optimal solution using the nominal values of the parameters for the manufacturing process and operation environment without considering the dispersion in the manufacturing process and the fluctuation of the operation environment, that the pareto optimal solution is calculated taking into account the dispersion in the manufacturing process and the fluctuation of the operation environment because of the following reasons. The reason will be explained by using FIG. 36. Similar to FIG. 9, in FIG. 36, the vertical axis represents cost1 (the lesser the value is, the better the performance is.), and the horizontal axis represents cost2 (the lesser the value is, the better the performance is.) Then, in FIG. 36, it is presupposed that the pareto optimal solutions A to D can be obtained based on the nominal values of the parameters. Here, the non-dominated solution C is obtained, as described above, when the nominal values are used for the parameters. However, when the dispersion in the manufacturing process and the fluctuation of the operation environment are taken into account for the pareto optimal solution C, solutions are obtained at points of "x" marks in a range $C_{disp}$. On the other hand, a solution F calculated by using the nominal value is not on the pareto curve, because C dominates F. However, it is presupposed that only solutions marked by "+" within a range $F_{disp}$, which is included in the range $C_{disp}$ and is narrower than the range $C_{disp}$, are obtained even if the dispersion in the manufacturing process and the fluctuation of the operation environment are taken into account for the solution F. In such a case, the solution C is the pareto optimal solution when the nominal values of the parameters are used. However, a solution $C_1$ is obtained when the manufacturing process and the operation environment badly affect. On the other hand, a solution $F_1$ is obtained for the solution F, even when the manufacturing process and the operation environment badly affect. In such a case, because $F_1$ dominates $C_1$, it is doubtful that the pareto optimal solution C is preferable. Namely, even when the pareto curve is generated based on the nominal values of the parameters, the actually manufactured chip may demonstrate the expected performance. However, it is preferable that the design is carried out taking into account the worst states, because there are various problems such as the manufacturing yield and the basic non-linearity of the analogue circuits, namely, the easiness of the performance fluctuation.

Figure 37:
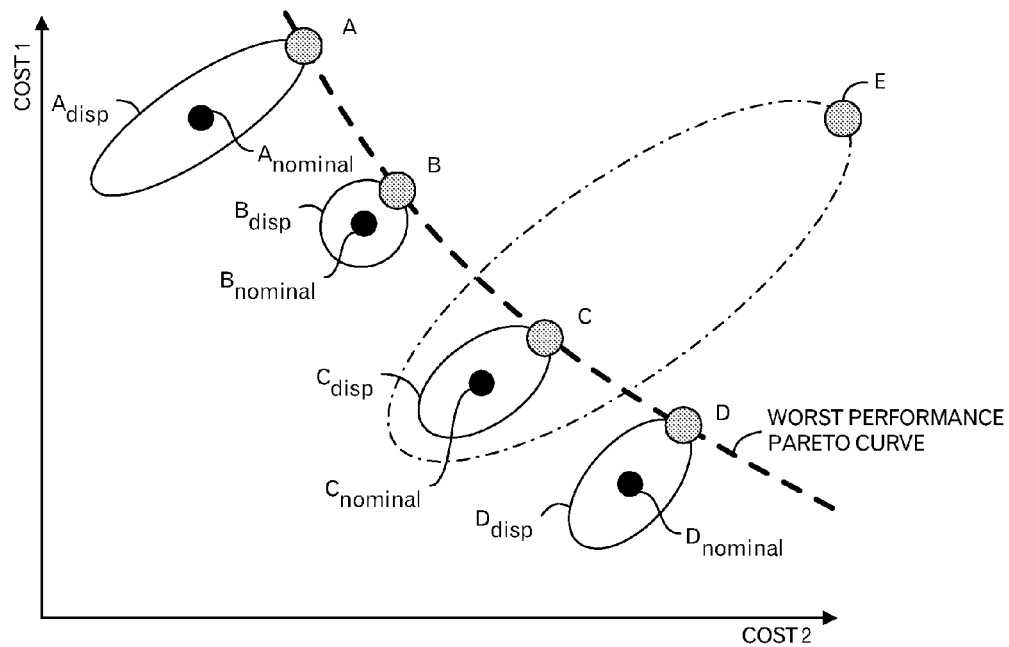
FIG. 37 is a diagram to explain the pareto curve for the worst performance.

Then, in this embodiment, as depicted in FIG. 37, the dominance relation is judged based on the solutions A to E having the largest costs (i.e. having the worst performance) in the ranges $A_{disp}$ to $D_{disp}$, which are determined for the respective solutions, taking into account the dispersion in the manufacturing process and the fluctuation of the operation environment, and the pareto optimal solutions A to D are identified without adopting the solutions $A_{nominal}$ to $D_{nominal}$ for the nominal values of the parameters. Based on these pareto optimal solutions A to D, the worst performance pareto curve is generated.

Accompanying finer design rules of the semiconductor process, values of parameters such as the threshold voltage of the transistor and the effective channel length largely vary from the nominal values (i.e. expected values) due to the dispersion in the manufacturing process, and the performance dispersion of the analogue circuit is enlarged because of that influence. In addition, because the threshold voltage of the transistor and power supply voltage of the chip are reduced to the limit in order to reduce the power consumption of the Large Scale Integrated circuit (LSI), the fluctuation of the circuit operation environment such as the power supply voltage and circuit operation temperature largely affects the LSI, especially the performance of the analogue circuit that frequently operates in the saturated region. This embodiment removes the influence due to the dispersion in the semiconductor manufacturing process and the fluctuation of the circuit operation environment as much as possible by identifying the pareto optimal solutions while considering the dispersion in the semiconductor manufacturing process and the fluctuation of the circuit operation environment. Thus, it becomes possible that the manufacturing yield of the chip is rapidly improved (ideally, the yield reaches 100%), and the performance is secured with enough margin.

Under this presupposition, the individual pareto generation processing will be explained according to FIG. 38. First, the individual pareto generation unit 8 identifies one unprocessed circuit configuration among the selected circuit configurations stored in the selected circuit configuration data storage 5 (step S411). Furthermore, the individual pareto generation unit 8 identifies one unprocessed process constraint condition among plural process constraint conditions stored in the process constraint condition storage 13 (step S413).

Then, the individual pareto generation unit 8 generates, for the identified circuit configuration, values of the design variables (e.g. circuit parameters including the gate length L and gate width W) that satisfy the corresponding constraint condition for the identified circuit configuration, which is stored in the constraint condition storage 1 and also satisfying the identified process constraint condition, by the random numbers, and stores the generated values into the storage device such as the main memory (step S415).

Then, the individual pareto generation unit 8 carries out a worst performance value obtaining processing (step S417). This worst performance value obtaining processing will be explained by using FIGS. 39 to 42. First, a processing flow when the corner simulation is carried out will be explained by using FIG. 39.

The individual pareto generation unit 8 identifies, for each of the PVT corner setting items registered in the PVT corner setting data storage 16, corner values (e.g. values designated among MIN, MAX and TYP) to be adopted based on setting conditions (in case of FIG. 32, MIN, TYP and MAX and in case of FIG. 33, the appearance range data and combination information) stored in the PVT corner setting data storage 16, and stores the identified values into the storage device such as the main memory (step S101). In case of FIG. 32, because the numeral values are designated by MIN, TYP and MAX, these are identified. In case of FIG. 33, when the distribution is defined as the appearance range data, a value calculated by (the average $\mu+3\sigma$) and a value calculated by (the average $\mu-3\sigma$) are identified, for example. Incidentally, as for the same item as the constraint condition, the value identified at the step S413 or step S423 described later is set as the average $\mu$ or the median c, and the values of $+3\sigma$ and $-3\sigma$ and values of $-a$ % and $+b$ % are calculated. For instance, the constraint condition defines a range from 1 V to 5 V for the voltage, and when the value identified at the step S413 or S423 is 1.5 V, 1.5 V is set as TYP, and 1.35 V is calculated as MIN defined as $-a$ % (=$-10$%), and 1.65 V is calculated as MAX defined as $+b$ % (=$+10$%).

Then, the individual pareto generation unit 8 identifies one unprocessed combination of the corner values for the respective PVT corner setting items (step S103). Furthermore, the individual pareto generation unit 8 reads out data of the peripheral circuits required for the circuit simulation for the identified circuit configuration from the test bench data storage 7, outputs to the circuit simulator 9, the read data of the peripheral circuits, data of the identified circuit configuration stored in the selected circuit configuration data storage 5, values of the design variables identified at the step S413 or S423 based on the constraint condition, the combination of the corner values for the PVT corner setting items and items (i.e. performance items) of the requirement specification stored in the specification data storage 3, causes the circuit simulator 9 to evaluate the respective performance items defined in the requirement specification, obtains the performance values of the respective performance items defined in the requirement specification from the circuit simulator 9, and stores the obtained data into the storage device such as the main memory (step S105).

Then, the individual pareto generation unit 8 judges whether or not all of the combinations of the corner values identified at the step S101 have been processed (step S107). When there is at least one unprocessed combination, the processing returns to the step S103. On the other hand, when all of the combinations have been processed, the individual pareto generation unit 8 identifies the performance (i.e. a set of performance values) considered to be worst among the performances each including values of the performance items defined in the requirement specification and the combination of the values of the design variables identified based on the constraint condition and the corner values of the PVT corner setting items, which cause the performance considered to be worst, and stores the identified data into the storage device such as the main memory (step S109).

Here, the performance considered to be worst means the worse performance $P_W$ even when compared with all other performances $P_j$ belonging to a dispersion space $\Omega_f$ of the performance values calculated at the step S105 for all combinations of the corner values of the PVT corner setting items. More specifically, when it is presupposed that the optimum means the minimum (e.g. in a graph of FIG. 37 and the like, the direction of the lower left is an optimal direction.), the respective performance item values $P_{wi}$ of the performance $P_w$ considered to be worse are larger than the values $P_{ji}$ of the respective performance items i for the performance $P_j$ (the number of performance items is n, and $P_j$ is an n-dimensional vector.) for all combinations j of the corner values of the respective PVT corner setting items.

$$P_W: \{P_{Wi} | (\forall i \forall j) P_{Wi} \geq P_{ji}, P_j \in \Omega_f\}, P_W \in R^n, i=1 \ldots n$$

More specifically, it is represented as follows:

$$P_W = \{P_{Wi} | P_{Wi} = \max(P_{ji}), P_j \in \Omega_f\}$$

In this case, the performance $P_w$ that all of the performance item values are worst among all performances $P_j$ belonging to the performance dispersion space $\Omega_f$ is considered to be worst. However, this is a mere example, and the performance that an evaluation value of any evaluation equation for evaluating the respective performance item values is greatest may be defined to be worst.

Incidentally, data stored at the step S109 is data as depicted in FIG. 40, for example. In an example of FIG. 40, values of the design variables 1 to k, values of the PVT corner setting items 1 to p (as for the same items as the design variables, an adjustment value against the value identified by the constraint condition) and the values of the performance items 1 to n are registered in association with the combination of the identifier of the circuit configuration and the identifier of the process constraint condition. Incidentally, as for the design variables that are also the PVT corner setting items, the values set at the step S413 or S423 are registered.

By carrying out the aforementioned processing, it is possible to identify the worst performance when one constraint condition set is identified. Then, the processing returns to the calling-source processing.

Figure 39:
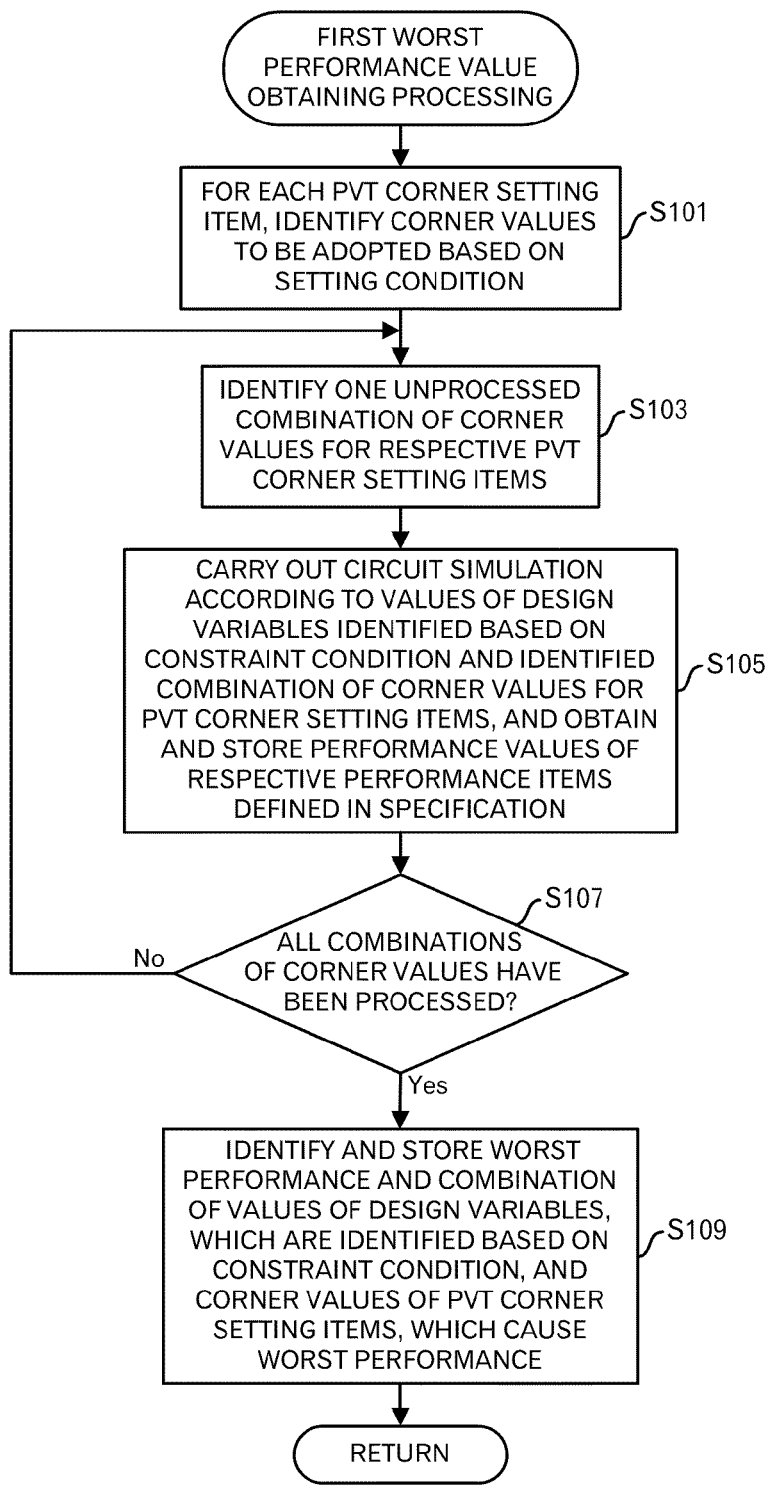
FIG. 39 is a diagram depicting a first example of a worst performance value obtaining processing.
Figure 41:
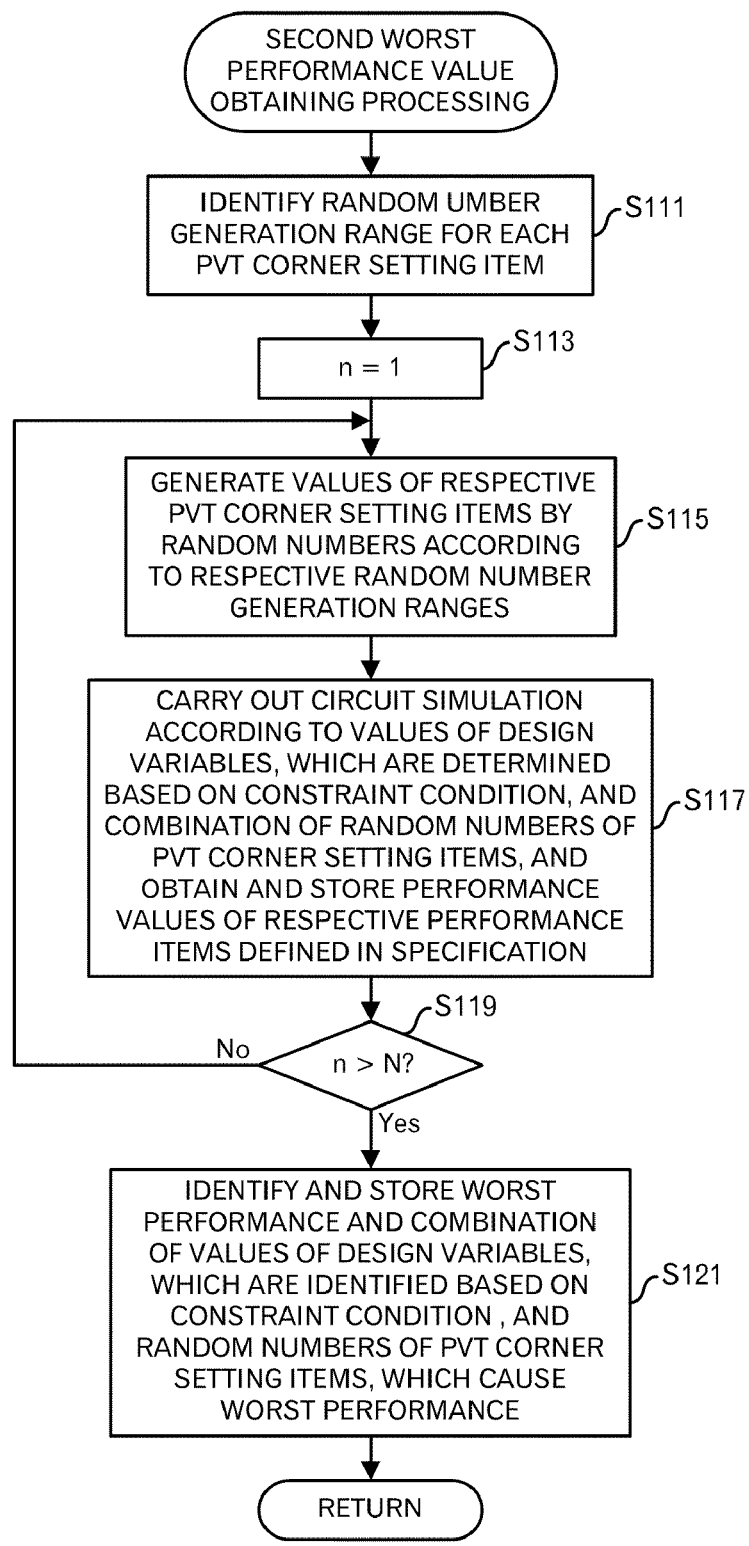
FIG. 41 is a diagram depicting a second example of the worst performance value obtaining processing.

The processing flow of FIG. 39 represents a processing flow to identify the worst performance by the corner simulation. However, the applicable algorithm for the worst performance value obtaining processing in this embodiment is not limited to the corner simulation. FIG. 41 depicts a processing when the Monte Carlo simulation is applied.

First, the individual pareto generation unit 8 identifies the random number generation range for each of the PVT corner setting item registered in the PVT corner setting data storage 16 (step S111). In the example of FIG. 35, when the random number generation distribution data is defined by, for example, the Gaussian distribution, the values of the average µ and variance σ are identified. Incidentally, as for the PVT corner setting item that is identical with the constraint condition, the values identified at the step S413 or step S423 described later are used as the average µ or median c, and "a" and "b" defining the variance σ or range are used as they are. For instance, the constraint condition defines a range from 1 V to 5 V for the voltage, and when the value identified at the step S413 or S423 is 1.5 V, 1.5 V is set as the median, and 1.35 V is calculated as the lower limit value of the random number generation, which is defined as –a % (=–10%), and 1.65 V is calculated as the upper limit value of the random number generation, which is defined as +b % (=+10%), and the range of the random number generation is defined by the lower limit value and the upper limit value.

Furthermore, the individual pareto generation unit 8 initializes a counter n to "1" (step S113), and generates the values of the respective PVT corner setting items by the random number, according to the respective random number generation ranges identified at the step S111, and stores the generated values into the storage device such as the main memory (step S115).

Furthermore, the individual pareto generation unit 8 reads out data of the peripheral circuits required for the circuit simulation for the identified circuit configuration from the test bench data storage 7, outputs to the circuit simulator 9, the read data of the peripheral circuits, data of the identified circuit configuration stored in the selected circuit configuration data storage 5, the values of the design variables identified at the step S413 or S423 based on the constraint condition, the combination of the random numbers of the PVT corner setting items and items (i.e. performance items) in the requirement specification stored in the specification data storage 3, and causes the circuit simulator 9 to evaluate the respective performance items defined in the requirement specification, obtains the performance values of the respective performance items defined in the requirement specification from the circuit simulator 9, and stores the obtained data into the storage device such as the main memory (step S117).

Then, the individual pareto generation unit 8 judges whether or not "n" exceeds a predetermined upper limit value N (step S119). When "n" is equal to or less than N, the processing returns to the step S115. On the other hand, when "n" exceeds N, the individual pareto generation unit 8 identifies the performance (i.e. a set of performance values) considered to be worst among the performances each including values of the performance items defined in the requirement specification and the combination of the values of the design variables identified based on the constraint condition and the random numbers of the PVT corner setting items, which cause the performance considered to be worst, and stores the identified data into the storage device such as the main memory (step S121). Data stored at the step S121 has the same format as in FIG. 40. In addition, the performance considered to be worst is as described above. Then, the processing returns to the calling source processing.

By carrying out the aforementioned processing, the worst performance can be identified even by using Monte Carlo simulation.

Figure 38:
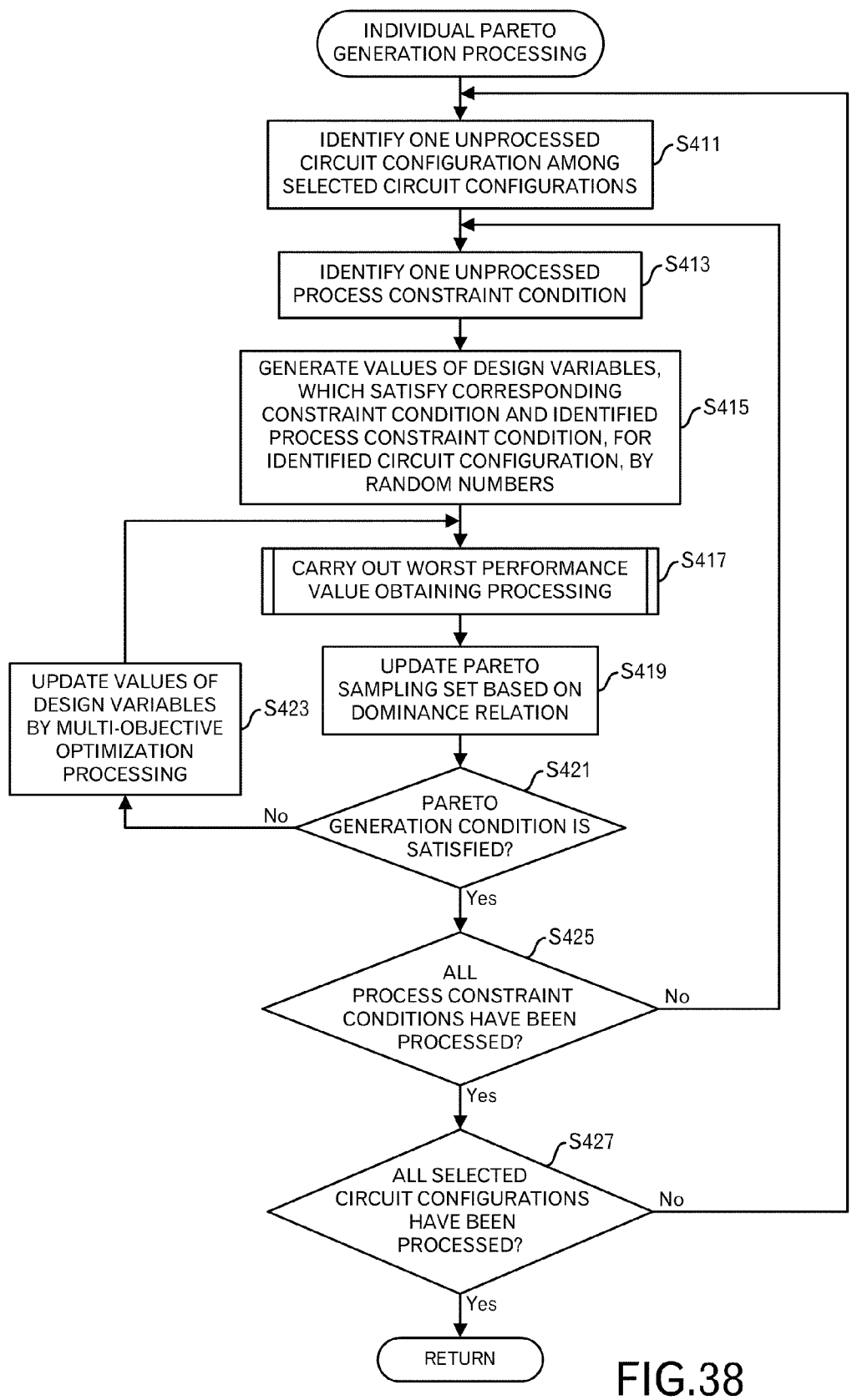
FIG. 38 is a diagram depicting a processing flow of the individual pareto generation processing in the second embodiment.

Returning to the explanation of the processing in FIG. 38, the individual pareto generation unit 8 judges by confirming the dominance relation with the respective pareto optimal solutions selected prior to this, whether or not the performance value set of the performance items, which are obtained at the step S417, constitutes the pareto optimal solution in the solution space, and updates the pareto sampling set based on the judgment result (step S419). Namely, when the solution constituted by the performance value set of the performance items, which are obtained at the step S417, dominates other solution, this other solution is removed from the pareto sampling set that is a set of the pareto optimal solutions, and the solution obtained at the step S417 is added to the pareto sampling set. On the other hand, when the solution obtained at the step S417 is dominated by other solution, this solution obtained at the step S417 is discarded.

The pareto sampling set is stored, for example, into the individual pareto data storage 10 as data as depicted in FIG. 42. In an example of FIG. 42, an identifier of the circuit configuration, an identifier of the process constraint condition, values of the design variables 1 to k, values of the PVT corner setting items 1 to p and values of the performance items 1 to n are registered. The number of variables, the number of PVT corner setting items and the number of performance items are mere examples, and those numbers may be larger. Thus, data for one pareto optimal solution is registered as one record. Then, records for one circuit configuration constitute the pareto sampling set.

After that, the individual pareto generation unit 8 judges whether or not the pareto generation condition stored in the pareto generation condition storage 6 is satisfied (step S421). The pareto generation condition is the same as that described for the first embodiment, and further explanation is omitted.

When the pareto generation condition is not satisfied, the individual pareto generation unit 8 updates the values of the design variables so as to satisfy the constraint conditions by the aforementioned well-known multi-objective optimization processing (e.g. crossover processing or mutation processing), and stores the updated values into the storage device such as the main memory (step S423). Then, the processing returns to the step S417.

On the other hand, when the pareto generation condition is satisfied, the individual pareto generation unit 8 judges whether or not all of the process constraint conditions have been processed (step S425). When at least one unprocessed process constraint condition exists, the processing returns to the step S413. On the other hand, when all of the process constraint conditions have been processed, the individual pareto generation unit 8 judges whether or not all of the selected circuit configurations have been processed (step S427). When there is at least one unprocessed circuit configuration, the processing returns to the step S411. On the other hand, when there is no unprocessed circuit configuration, the processing returns to the calling source processing.

By carrying out such a processing, a set of the pareto optimal solutions is generated for each circuit configuration. When schematically representing the solution space as the two-dimensional space, the plural solutions constituting the pareto curve as depicted in FIG. 13 are obtained.

Incidentally, depicting in detail, FIG. 13 represents a relation as depicted in FIG. 37. The pareto curve (pareto curved surface in the three-dimensional space or more) in FIG. 37, namely, the non-dominated solutions $P_{w\_pareto}$ are represented as follows:

$$P_{W\_Pareto} = \{P_i | \forall j (j \neq i), \neg (P_{jworst} \prec P_{iworst}), P_i, P_j \in \Omega_P\}$$

Incidentally, the meaning of the symbol between $P_{jworst}$ and $P_{iworst}$ is as follows:

$$a \prec b \Leftrightarrow \forall i (a_i \leq b_i) \wedge \exists i (a_i < b_i) \quad (A)$$

Thus, the worst performance pareto curve is formed based on a condition that, when the solutions $P_i$ and $P_j$ for the nominal values, which belong to the solution space $\Omega_p$, are presupposed, the worst performance solution $P_{iworst}$, which follows the constraint condition of the solution $P_i$ is a non-dominated solution against the worst performance solution $P_{jworst}$, which follows the constraint condition of any solution $P_j$.

When the processing of the step S7 and subsequent steps in FIG. 8 is carried out almost similar to the first embodiment after the aforementioned processing is carried out, it becomes possible to automatically identify the pareto sampling sets that the manufacturing yield, which is ideally almost 100% at the manufacturing, is realized by taking into account the dispersion in the manufacturing process and the fluctuation of the operation environment. Therefore, the user who actually carries out the circuit design can automatically identify the optimal solution, which can realize the manufacturing yield, which is ideally almost 100% at the manufacturing.

Incidentally, as for the item identical with the PVT corner setting item among the circuit parameters whose value is determined at the step S59, a value adjusted by the value of the item, which is included in the data set at the step S307 or S309, is adopted.

Furthermore, at the step S313 of FIG. 26, the performance values of the respective performance items for the provisional optimal solution after the reverse space conversion may be outputted.

Although the embodiments are described above, this technique is not limited to these embodiments. For example, the configurations of the apparatuses depicted in FIGS. 2, 25 and 31 are mere examples, and do not always correspond to the actual program module configuration. In addition, the data storage method may be changed. For example, the circuit configuration library storage 2 and the constraint condition storage 1 may be integrated.

In addition, as long as the processing result does not change, the order of the step in the processing flow may be changed or plural steps may be executed in parallel. Especially, the circuit simulator 9 may be implemented in plural different apparatuses, and the individual pareto generation unit 8 may instruct the respective circuit simulators 9 to carry out the circuit simulation for different circuit configurations.

Furthermore, although an example is described that the corner simulation or Monte Carlo simulation is carried out, other methods that can identify the worst performance may be adopted, such as statistical analysis.

In the aforementioned example, the apparatus is implemented by a stand-alone type computer. However, a client-server type computer system may be adopted. Furthermore, the processing at the step S51 may not be carried out collectively, but a calculation equation for the space conversion $P_{tran}$ may be generated in advance and may be held to execute the space conversion every time the calculation of the distance is required.

Figure 25:
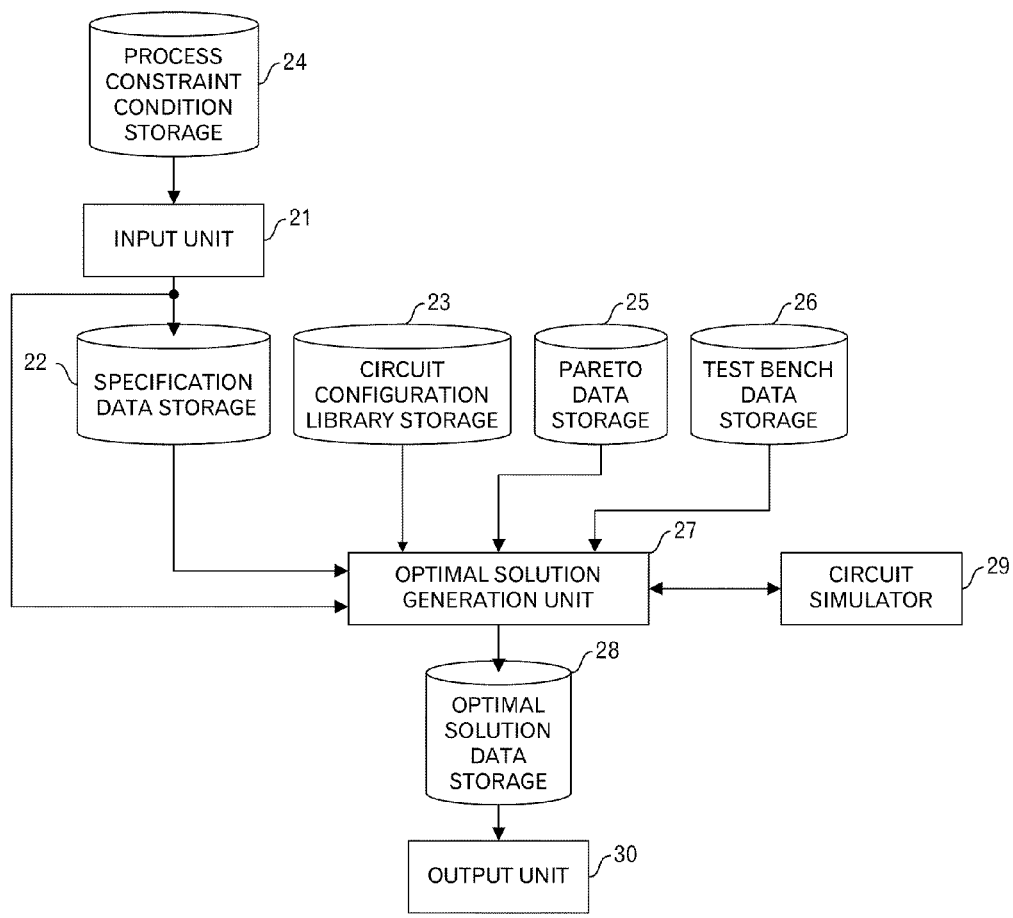
FIG. 25 is a functional block diagram depicting an automatic optimum circuit design apparatus.
Figure 43:
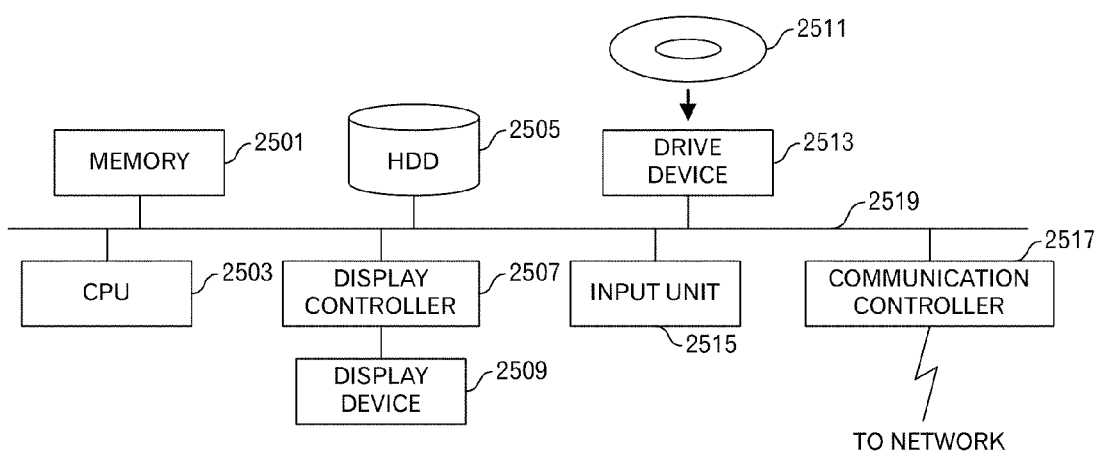
FIG. 43 is a functional block diagram of a computer.

In addition, the apparatus depicted in FIG. 2, 25 or 31 is a computer device as shown in FIG. 43. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 43. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predefined operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Figure 44:
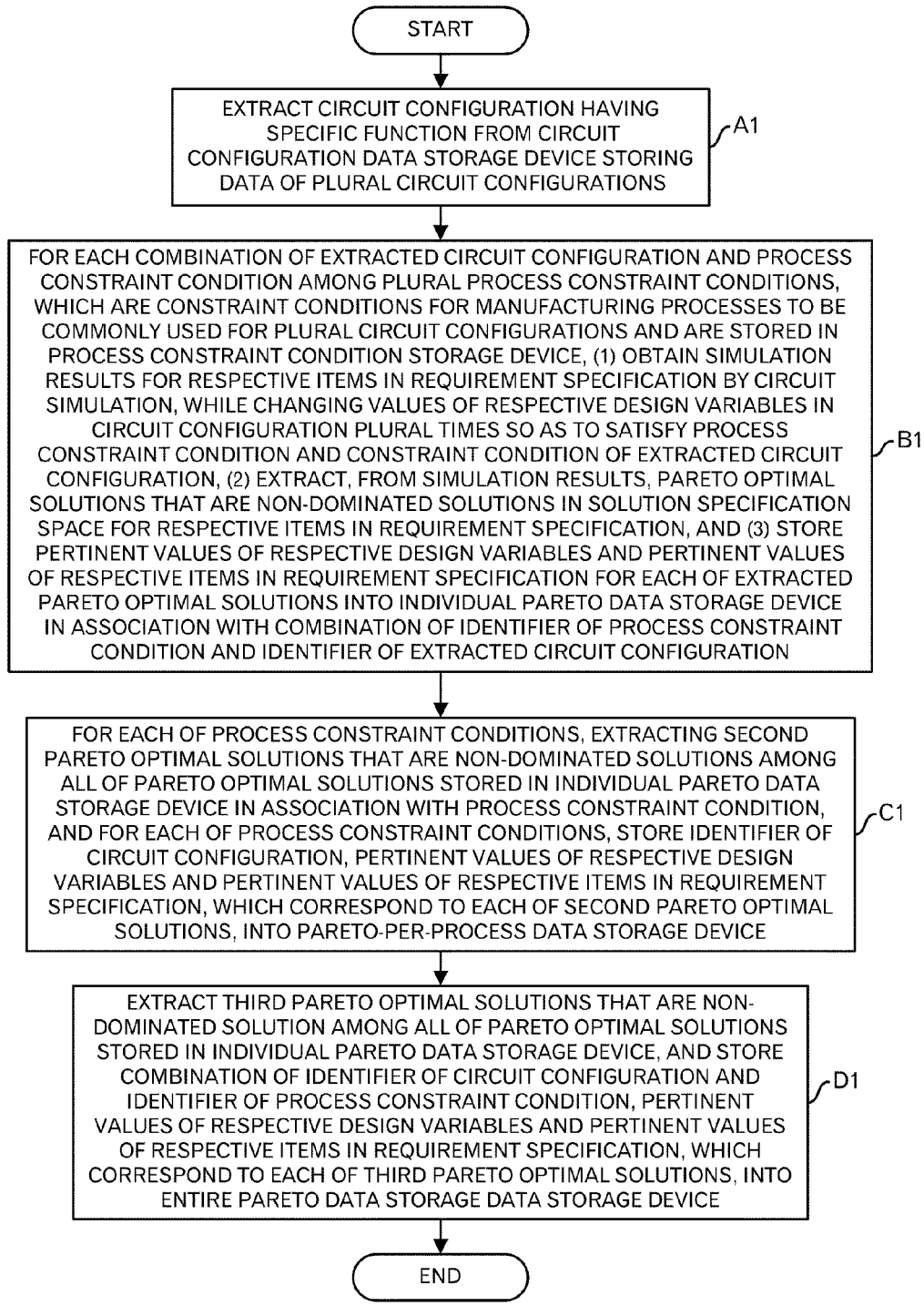
FIG. 44 is a diagram depicting a processing flow of a new analog IP data generation processing in the embodiments.

The aforementioned embodiments are outlined as follows:

A pareto data generation method (FIG. 44), relating to a first aspect of the embodiments, for an automatic circuit design, includes: (A1) extracting a circuit configuration having a specific function from a circuit configuration data storage device storing data of a plurality of circuit configurations; (B1) for each combination of the extracted circuit configuration and a process constraint condition among a plurality of process constraint conditions, which are constraint conditions for manufacturing processes to be commonly used for the plurality of circuit configurations and are stored in a process constraint condition storage device, (1) obtaining simulation results for respective items in requirement specification by circuit simulation, while changing values of respective design variables in the circuit configuration a plurality of times so as to satisfy the process constraint condition and a constraint condition of the extracted circuit configuration, (2) extracting, from the simulation results, pareto optimal solutions that are non-dominated solutions in a solution specification space for the respective items in the requirement specification, and (3) storing pertinent values of the respective design variables and pertinent values of the respective items in the requirement specification for each of the extracted pareto optimal solution into an individual pareto data storage device in association with a combination of an identifier of the process constraint condition and an identifier of the extracted circuit configuration; (C1) for each of the process constraint conditions, extracting second pareto optimal solutions that are non-dominated solutions among all of the pareto optimal solutions stored in said individual pareto data storage device in association with the process constraint condition, and for each of the process constraint conditions, storing an identifier of the circuit configuration, the pertinent values of the respective design variables and the pertinent values of the respective items in the requirement specification, which correspond to each of the second pareto optimal solutions, into a pareto-per-process data storage device; and (D1) extracting third pareto optimal solutions that are non-dominated solution among all of the pareto optimal solutions stored in the individual pareto data storage device, and storing the combination of the identifier of the circuit configuration and the identifier of the process constraint condition, the pertinent values of the respective design variables and the pertinent values of the respective items in the requirement specification, which correspond to each of the third pareto optimal solutions, into an entire pareto data storage data storage device.

By distributing to the user who actually conducts the circuit design, data stored in the pareto-per-process data storage device and the entire pareto data storage device and obtained by carrying out such a pre-processing, it becomes possible for the user to carry out the automatic circuit design with a short time because the aforementioned processing is not carried out at the user side.

Incidentally, the aforementioned processing (B1) may include carrying out the circuit simulation a plurality of times while changing values of specific items among the items, which are set in the circuit simulation, and adopting as one simulation result of the plurality of simulation results, a result indicating worst performance among a plurality of results of the circuit simulation.

Thus, when the circuit configuration and the design variable values are identified by carrying out the aforementioned processing, after the pareto optimal solutions are generated by adopting the result indicating the worst performance, and a chip is manufactured by using the identified circuit configuration and design variable values, it is expected that a chip embodying circuits satisfying the requirement specification or having the performance close to the requirement specification is obtained even in the worst case. Namely, because the design can be carried out taking into account the worst case of the dispersion in the manufacturing and the like, the rapid improvement of the manufacturing yield is expected.

Furthermore, the aforementioned carrying out and adopting may include generating, by the random numbers, values of the respective specific items based on data of a random number generation range designated for the respective specific items; and carrying out the circuit simulation for a set of the generated values of the respective specific items. For example, this is to identify the result indicating the worst performance by, for example, the Monte Carlo simulation.

In addition, the aforementioned carrying out and adopting may include identifying values preselected among an upper limit value, a representative value and a lower limit value of the respective specific items based on corner value setting data designated for the respective specific items; and carrying out the circuit simulation for each combination of the values preselected among the upper limit value, the representative value and the lower limit value of the respective specific items. For example, the result indicating the worst performance may be identified by the corner simulation.

Figure 45:
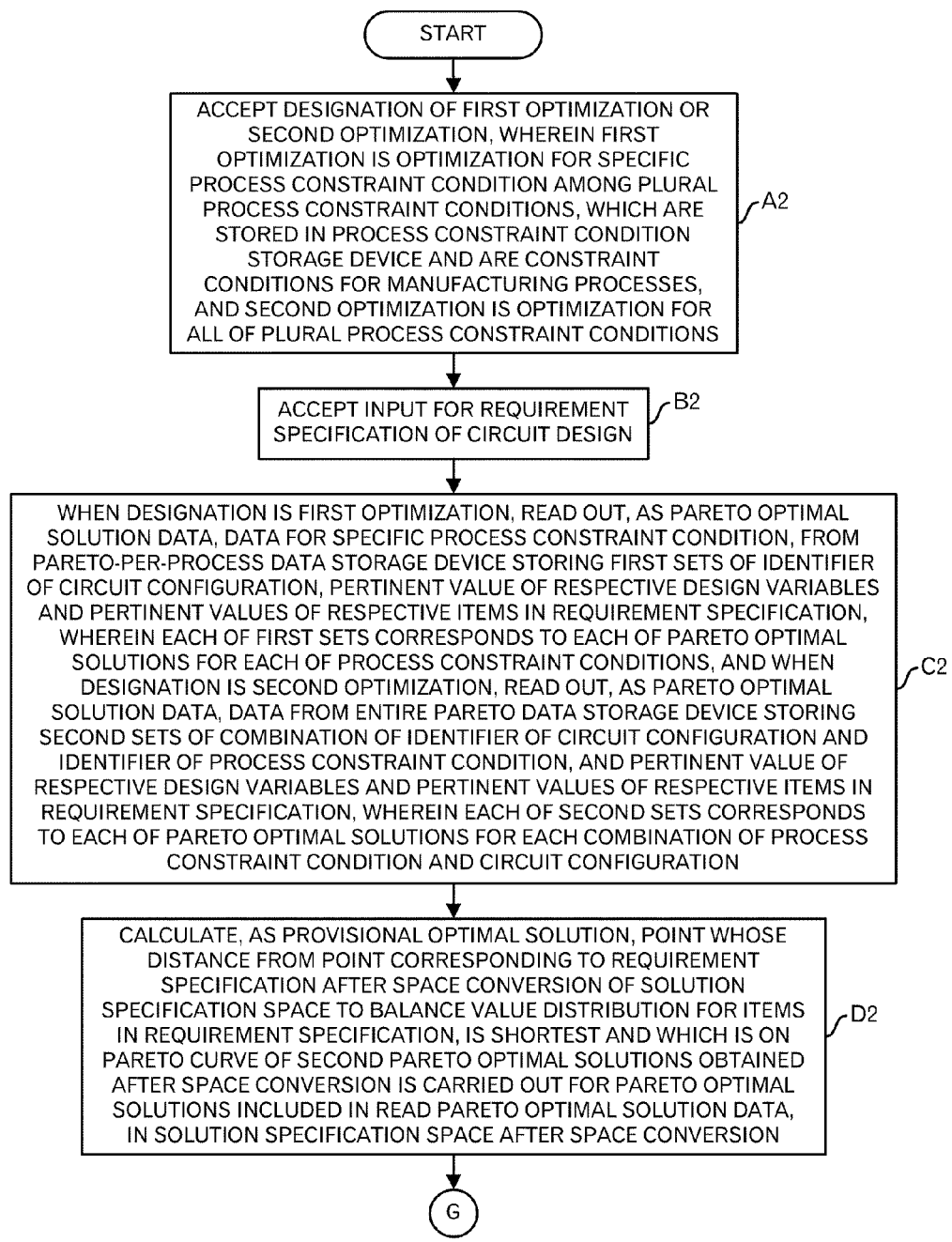
FIG. 45 is a diagram depicting a processing flow of the circuit design processing in the embodiments.
Figure 46:
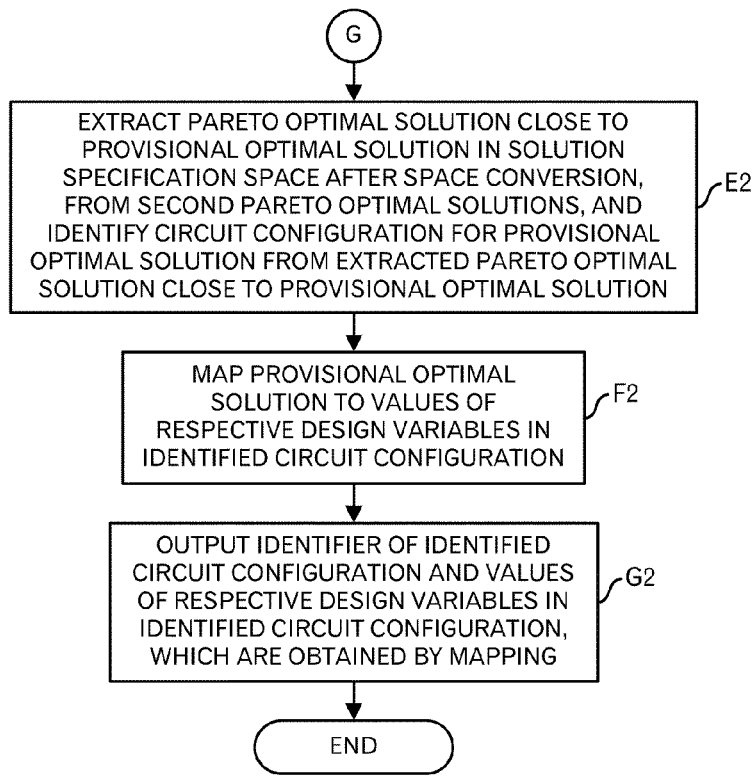
FIG. 46 is a diagram depicting a processing flow of the circuit design processing in the embodiments.

An automatic circuit design method (FIGS. 45 and 46) relating to a second aspect of the embodiments includes (A2) accepting designation of first optimization or second optimization, wherein the first optimization is optimization for a specific process constraint condition among a plurality of process constraint conditions, which are stored in a process constraint condition storage device and are constraint conditions for manufacturing processes, and the second optimization is optimization for all of the plurality of process constraint conditions; (B2) accepting an input for requirement specification of a circuit design; (C2) when the designation is the first optimization, (1) reading out, as pareto optimal solution data, data for the specific process constraint condition, from a pareto-per-process data storage device storing first sets of an identifier of a circuit configuration, pertinent value of respective design variables and pertinent values of respective items in the requirement specification, wherein each of the first sets corresponds to each of pareto optimal solutions for each of the process constraint conditions, and when the designation is the second optimization, (2) reading out, as pareto optimal solution data, data from an entire pareto data storage device storing second sets of a combination of an identifier of a circuit configuration and an identifier of a process constraint condition, pertinent value of respective design variables and pertinent values of respective items in the requirement specification, wherein each of the second sets corresponds to each of pareto optimal solutions for each combination of the process constraint condition and the circuit configuration; (D2) calculating, as a provisional optimal solution, a point whose distance from a point corresponding to the requirement specification after space conversion of the solution specification space to balance value distribution for the respective items in the requirement specification, is shortest and which is on a pareto curve of second pareto optimal solutions obtained after the space conversion is carried out for pareto optimal solutions included in the read pareto optimal solution data, in the solution specification space after the space conversion; (E2) extracting a pareto optimal solution close to the provisional optimal solution in the solution specification space after the space conversion, from the second pareto optimal solutions, and identifying circuit configuration for the provisional optimal solution from the extracted pareto optimal solution close to the provisional optimal solution; (F2) mapping the provisional optimal solution to values of the respective design variables in the identified circuit configuration; and (G2) outputting an identifier of the identified circuit configuration and the values of the respective design variables in the identified circuit configuration, which are obtained by the mapping.

When the pareto-per-process data storage device and the entire pareto data storage device, which store data for this method, are prepared, the time to generate data is reduced. Therefore, the time for the automatic circuit design is reduced.

In addition, this automatic circuit design method may further include carrying out the circuit simulation by using values of the respective design variables for the circuit configuration, which are obtained by the mapping, and judging whether or not the provisional optimal solution after the reverse space conversion of the space conversion can be realized. In such a case, the outputting may be executed when it is judged that the provisional optimal solution can be realized. This is to output the processing result after confirming whether or not a circuit that can actually achieve the same performance as the provisional optimal solution can be realized.

In addition, this automatic circuit design method may further include, when it is judged that the provisional optimal solution after the reverse space conversion of the space conversion cannot be realized, identifying a next candidate solution from the second pareto optimal solutions close to the provisional solution, and identifying the second circuit configuration for the next candidate solution; mapping the next candidate solution to values of the respective design variables for the identified second circuit configuration; judges by carrying out the circuit simulation by using the values of the respective design variables for the identified second circuit configuration, which are obtained by the mapping the next candidate solution, whether or not the next candidate solution after the reverse space conversion can be realized; when it is judged that the next candidate solution can be realized, outputting the identified second circuit configuration and the values of the respective design variables for the identified second circuit configuration, which are obtained by the mapping the next candidate solution. Thus, when the circuit to actually achieve the same performance as the provisional optimal solution cannot be realized, the next candidate is identified from the second pareto optimal solutions close to the provisional optimal solutions and is examined to identify a set of the next appropriate circuit and circuit design values.

Figure 47:
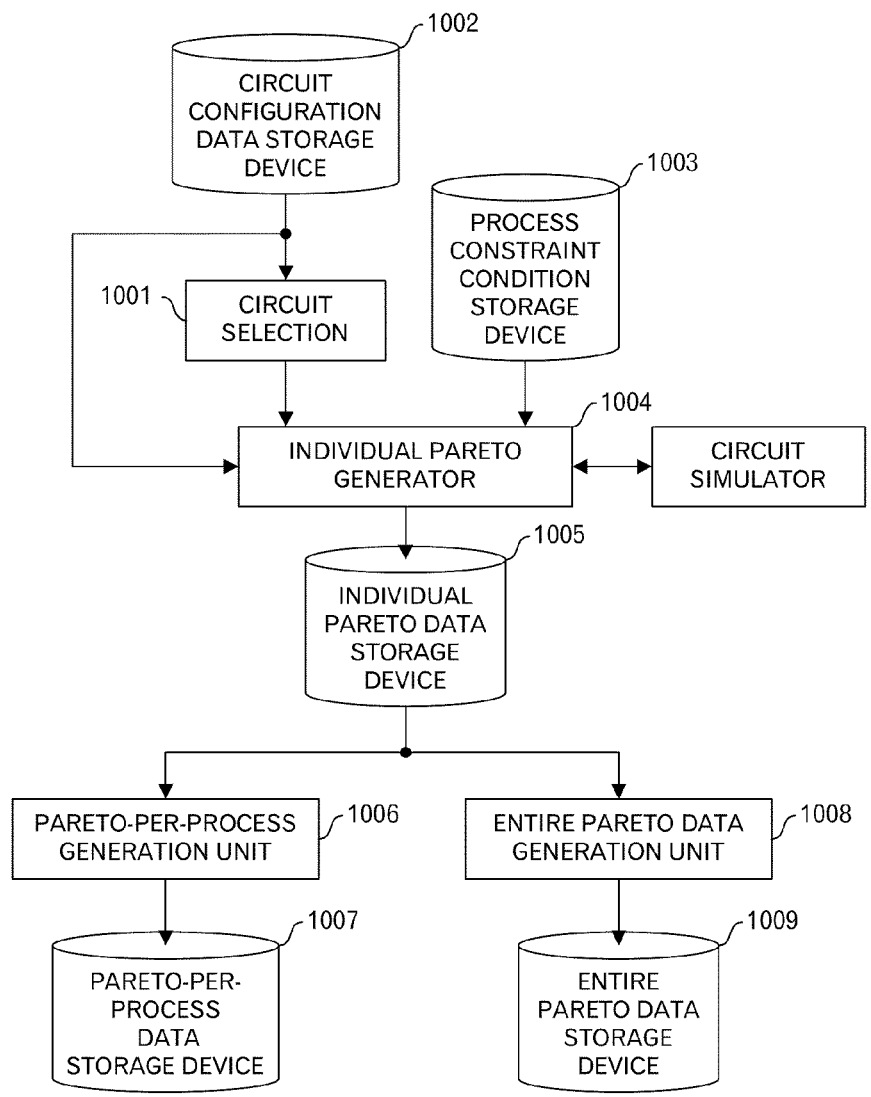
FIG. 47 is a functional block diagram of a pareto data generation apparatus for automatic circuit design in the embodiments.

Furthermore, a pareto data generation apparatus (FIG. 47) relating to a third aspect of the embodiments includes: (A) a circuit selector (FIG. 47: 1001) to extract a circuit configuration having a specific function from a circuit configuration data storage device (FIG. 47: 1002) storing data of a plurality of circuit configurations; (B) an individual pareto generator (FIG. 47: 1004) to carry out a processing for each combination of the extracted circuit configuration and a process constraint condition among a plurality of process constraint conditions, which are constraint conditions for manufacturing processes to be commonly used for the plurality of circuit configurations and are stored in a process constraint condition storage device (FIG. 47: 1003), wherein the processing includes: (1) obtaining simulation results for respective items in requirement specification by circuit simulation, while changing values of respective design variables in the circuit configuration a plurality of times so as to satisfy the process constraint condition and a constraint condition of the extracted circuit configuration, (2) extracting, from the simulation results, pareto optimal solutions that are non-dominated solutions in a solution specification space for the respective items in said requirement specification, and (3) storing pertinent values of the respective design variables and pertinent values of the respective items in the requirement specification for each of the extracted pareto optimal solutions into an individual pareto data storage device (FIG. 47: 1005) in association with a combination of an identifier of the process constraint condition and an identifier of the extracted circuit configuration; (C) a pareto-per-process generation unit (FIG. 47: 1006) to extract, for each of the process constraint conditions, second pareto optimal solutions that are non-dominated solutions among all of the pareto optimal solutions stored in the individual pareto data storage device in association with the process constraint condition, and to store, for each of the process constraint conditions, an identifier of the circuit configuration, the pertinent values of the respective design variables and the pertinent values of the respective items in the requirement specification, which correspond to each of the second pareto optimal solutions, into a pareto-per-process data storage device (FIG. 47: 1007); and (D) an entire pareto data generation unit (FIG. 47: 1008) to extract third pareto optimal solutions that are non-dominated solution among all of the pareto optimal solutions stored in the individual pareto data storage device, and to store the combination of the identifier of the circuit configuration and the identifier of the process constraint condition, the pertinent values of the respective design variables and the pertinent values of the respective items in the requirement specification, which correspond to each of the third pareto optimal solutions, into an entire pareto data storage data storage device (FIG. 47: 1009).

Figure 48:
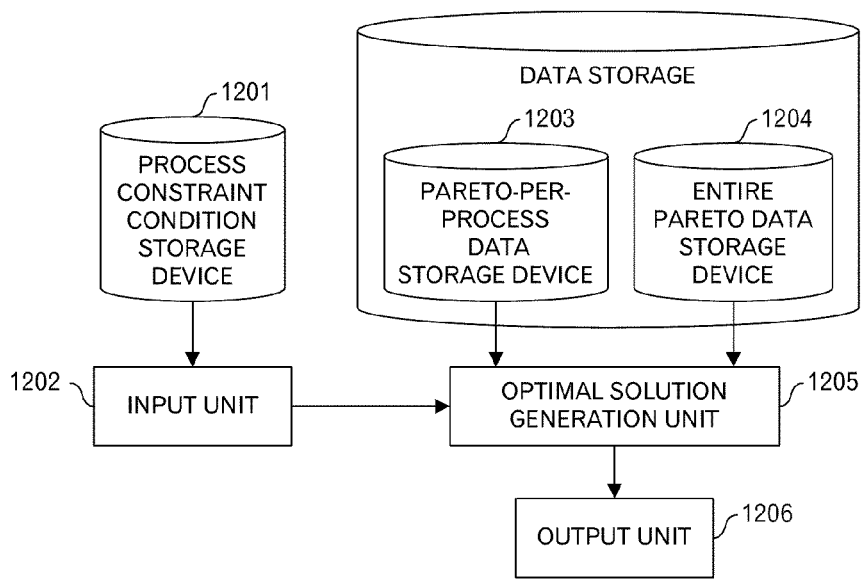
FIG. 48 is a functional block diagram of an automatic optimum circuit design apparatus in the embodiments.

An automatic circuit design apparatus (FIG. 48) relating to a fourth aspect of the embodiment includes (A) an input unit (FIG. 48: 1202) to accept designation of first optimization or second optimization, wherein the first optimization is optimization for a specific process constraint condition among a plurality of process constraint conditions, which are stored in a process constraint condition storage device (FIG. 48: 1201) and are constraint conditions for manufacturing processes, and the second optimization is optimization for all of the plurality of process constraint conditions, and to accept an input for requirement specification of a circuit design; (B) an optimal solution generation unit (FIG. 48: 1205) to carry out a processing including, (1) when the designation is the first optimization, reading out, as pareto optimal solution data, data for the specific process constraint condition, from a pareto-per-process data storage device (FIG. 48: 1203) storing first sets of an identifier of a circuit configuration, pertinent value of respective design variables and pertinent values of respective items in the requirement specification, wherein each of the first sets corresponds to each of pareto optimal solutions for each of the process constraint conditions, and when the designation is the second optimization, reading out, as pareto optimal solution data, data from an entire pareto data storage device (FIG. 48: 1204) storing second sets of a combination of an identifier of a circuit configuration and an identifier of a process constraint condition, pertinent value of respective design variables and pertinent values of respective items in the requirement specification, wherein each of the second sets corresponds to each of pareto optimal solutions for each combination of the process constraint condition and the circuit configuration; (2) calculating, as a provisional optimal solution, a point whose distance from a point corresponding to the requirement specification after space conversion of the solution specification space to balance value distribution for the respective items in the requirement specification, is shortest and which is on a pareto curve of second pareto optimal solutions obtained after the space conversion is carried out for pareto optimal solutions included in the read pareto optimal solution data, in the solution specification space after the space conversion; (3) extracting a pareto optimal solution close to the provisional optimal solution in the solution specification space after the space conversion, from the second pareto optimal solutions, and identifying circuit configuration for the provisional optimal solution from the extracted pareto optimal solution close to the provisional optimal solution; and (4) mapping the provisional optimal solution to values of the respective design variables in the identified circuit configuration; and (C) an output unit (FIG. 48: 1206) to output an identifier of the identified circuit configuration and the values of the respective design variables in the identified circuit configuration, which are obtained by the mapping.

Incidentally, it is possible to create a program causing a computer to execute the aforementioned processing, and such a program is stored in a non-transitory computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a pareto data generation program for an automatic circuit design for causing a computer to execute a procedure, the procedure comprising:

first extracting a circuit configuration having a specific function from a circuit configuration data storage device storing data of a plurality of circuit configurations;

for each combination of the extracted circuit configuration and a process constraint condition among a plurality of process constraint conditions, which are constraint conditions for manufacturing processes to be commonly used for said plurality of circuit configurations and are stored in a process constraint condition storage device, obtaining simulation results for a set of plural items in requirement specification by circuit simulation, while changing a value of each of plural design variables in the circuit configuration a plurality of times so as to satisfy said process constraint condition and a constraint condition of the extracted circuit configuration;

second extracting, from said simulation results, pareto optimal solutions that are non-dominated solutions in a solution specification space for said set of plural items in said requirement specification, and storing values of said plural design variables and values of said set of plural items in said requirement specification for each of the extracted pareto optimal solutions into an individual pareto data storage device in association with a combination of an identifier of the process constraint condition and an identifier of the extracted circuit configuration;

for each of said process constraint conditions, third extracting second pareto optimal solutions that are non-dominated solutions among all of said pareto optimal solutions stored in said individual pareto data storage device in association with the process constraint condition;

for each of said process constraint conditions, storing said identifier of said circuit configuration, said values of said plural design variables and said values of said set of plural items in said requirement specification, which correspond to each of said second pareto optimal solutions, into a pareto-per-process data storage device;

fourth extracting third pareto optimal solutions that are non-dominated solution among all of said pareto optimal solutions stored in said individual pareto data storage device, and storing said combination of said identifier of said extracted circuit configuration and said identifier of said process constraint condition, said values of said plural design variables and said values of said set of plural items in said requirement specification, which correspond to each of said third pareto optimal solutions, into an entire pareto data storage data storage device.

2. The non-transitory computer-readable storage medium as set forth in claim 1, wherein said obtaining comprises: carrying out said circuit simulation a plurality of times while changing values of specific items among said set of plural items set in said circuit simulation, and adopting, as one simulation result of said plurality of simulation results, a result indicating worst performance among a plurality of results of said circuit simulations.

3. The non-transitory computer-readable storage medium as set forth in claim 2, wherein said carrying out and adopting comprises:

generating, by random numbers, values of the specific items based on data of a random number generation range designated for the specific items; and carrying out said circuit simulation for a set of the generated values of the specific items.

4. The non-transitory computer-readable storage medium as set forth in claim 2, wherein said carrying out and adopting comprises:

identifying values preselected among an upper limit value, a representative value and a lower limit value of the specific items based on corner value setting data designated for the specific items; and carrying out said circuit simulation for each combination of said values preselected among said upper limit value, said representative value and said lower limit value of the specific items.

5. A non-transitory computer-readable storage medium storing an automatic circuit design program for causing a computer to execute a procedure, the procedure comprising:

accepting designation of first optimization or second optimization, wherein said first optimization is optimization for a specific process constraint condition among a plurality of process constraint conditions, which are stored in a process constraint condition storage device and are constraint conditions for manufacturing processes, and said second optimization is optimization for all of said plurality of process constraint conditions;

accepting an input for requirement specification of a circuit design;

upon accepting said designation of said first optimization, reading out, as pareto optimal solution data, data for said specific process constraint condition, from a pareto-per-process data storage device storing first sets of an identifier of a circuit configuration, values of plural design variables and values of plural items in said requirement specification, wherein each of said first sets corresponds to each of pareto optimal solutions for each of said process constraint conditions;

upon accepting said designation of said second optimization, reading out, as pareto optimal solution data, data from an entire pareto data storage device storing second sets of a combination of an identifier of a circuit configuration and an identifier of a process constraint condition, value of plural design variables and values of plural items in said requirement specification, wherein each of said second sets corresponds to each of pareto optimal solutions for each combination of said process constraint condition and said circuit configuration;

calculating, as a provisional optimal solution, a point whose distance from a point corresponding to said requirement specification after space conversion of a solution specification space to balance value distribution for said plural items in said requirement specification, is shortest and which is on a pareto curve of second pareto optimal solutions obtained after said space conversion is carried out for pareto optimal solutions included in the read pareto optimal solution data, in said solution specification space after said space conversion;

extracting a pareto optimal solution close to said provisional optimal solution in said solution specification space after said space conversion, from said second pareto optimal solutions, and identifying circuit configuration for said provisional optimal solution from the extracted pareto optimal solution close to said provisional optimal solution;

mapping said provisional optimal solution to values of said plural design variables in the identified circuit configuration; and outputting an identifier of the identified circuit configuration and said values of said plural design variables in the identified circuit configuration, which are obtained by the mapping.

6. The non-transitory computer-readable storage medium as set forth in claim 5, wherein said procedure further comprises:

carrying out said circuit simulation by using said values of said plural design variables for the identified circuit configuration, which are obtained by said mapping, and judging whether or not said provisional optimal solution after said reverse space conversion of said space conversion can be realized, and wherein said outputting is executed upon being judged that said provisional optimal solution after said reverse space conversion can be realized.

7. The non-transitory computer-readable storage medium as set forth in claim 6, wherein said procedure further comprises:

upon being judged that said provisional optimal solution after said reverse space conversion cannot be realized, identifying a next candidate solution from said second pareto optimal solutions close to said provisional optimal solution, and identifying a second circuit configuration for said next candidate solution;

mapping said next candidate solution to values of said plural design variables for the identified second circuit configuration;

judges by carrying out said circuit simulation by using said values of said plural design variables for the identified second circuit configuration, which are obtained by said mapping said next candidate solution, whether or not said next candidate solution after said reverse space conversion can be realized;

upon being judged that said next candidate solution can be realized, outputting the identified second circuit configuration and said values of said plural design variables for the identified second circuit configuration, which are obtained by said mapping said next candidate solution.

8. A pareto data generation apparatus for automatic circuit design, comprising:

a circuit configuration data storage device for storing data of a plurality of circuit configurations;

a circuit selection means for extracting a circuit configuration having a specific function from said circuit configuration data storage device;

an individual pareto generation means for carrying out a processing for each combination of the extracted circuit configuration and a process constraint condition among a plurality of process constraint conditions, which are constraint conditions for manufacturing processes to be commonly used for said plurality of circuit configurations and are stored in a process constraint condition storage device, wherein said processing includes:

obtaining simulation results for a set of plural items in requirement specification by circuit simulation, while changing a value of each of plural design variables in the extracted circuit configuration a plurality of times so as to satisfy the process constraint condition and a constraint condition of the extracted circuit configuration;

extracting, from said simulation results, pareto optimal solutions that are non-dominated solutions in a solution specification space for said set of plural items in said requirement specification; and storing values of said plural design variables and values of said set of plural items in said requirement specification for each of the extracted pareto optimal solutions into an individual pareto data storage device in association with a combination of an identifier of said process constraint condition and an identifier of the extracted circuit configuration;

a pareto-per-process generation means for extracting, for each of said process constraint conditions, second pareto optimal solutions that are non-dominated solutions among all of said pareto optimal solutions stored in said individual pareto data storage device in association with the process constraint condition, and storing, for each of said process constraint conditions, an identifier of said circuit configuration, said values of said plural design variables and said values of said set of plural items in said requirement specification, which correspond to each of said second pareto optimal solutions, into a pareto-per-process data storage device; and an entire pareto data generation means for extracting third pareto optimal solutions that are non-dominated solution among all of said pareto optimal solutions stored in said individual pareto data storage device, and storing said combination of said identifier of the extracted circuit configuration and said identifier of said process constraint condition, said values of said plural design variables and said values of said set of plural items in said requirement specification, which correspond to each of said third pareto optimal solutions, into an entire pareto data storage data storage device.

9. A pareto data generation apparatus for automatic circuit design, comprising:
   a circuit configuration data storage device for storing data of a plurality of circuit configurations; and
   a processor executing an operation, the operation comprising:
      extracting a circuit configuration having a specific function from said circuit configuration data storage device;
      carrying out a processing for each combination of the extracted circuit configuration and a process constraint condition among a plurality of process constraint conditions, which are constraint conditions for manufacturing processes to be commonly used for said plurality of circuit configurations and are stored in a process constraint condition storage device, wherein said processing includes:
         obtaining simulation results for a set of plural items in requirement specification by circuit simulation, while changing a value of each of plural design variables in the extracted circuit configuration a plurality of times so as to satisfy the process constraint condition and a constraint condition of the extracted circuit configuration;
         extracting, from said simulation results, pareto optimal solutions that are non-dominated solutions in a solution specification space for said set of plural items in said requirement specification; and
         storing values of said plural design variables and values of said set of plural items in said requirement specification for each of the extracted pareto optimal solutions into an individual pareto data storage device in association with a combination of an identifier of said process constraint condition and an identifier of the extracted circuit configuration;
      extracting, for each of said process constraint conditions, second pareto optimal solutions that are non-dominated solutions among all of said pareto optimal solutions stored in said individual pareto data storage device in association with the process constraint condition, and storing, for each of said process constraint conditions, an identifier of said circuit configuration, said values of said plural design variables and said values of said set of plural items in said requirement specification, which correspond to each of said second pareto optimal solutions, into a pareto-per-process data storage device; and
      extracting third pareto optimal solutions that are non-dominated solution among all of said pareto optimal solutions stored in said individual pareto data storage device, and storing said combination of said identifier of the extracted circuit configuration and said identifier of said process constraint condition, said values of said plural design variables and said values of said set of plural items in said requirement specification, which correspond to each of said third pareto optimal solutions, into an entire pareto data storage data storage device.

10. An automatic circuit design apparatus, comprising:
    a process constraint condition storage device for storing a plurality of process constraint conditions, which are constraint conditions for manufacturing processes;
    an input means for accepting designation of first optimization or second optimization, wherein said first optimization is optimization for a specific process constraint condition among said plurality of process constraint conditions stored in said process constraint condition storage device, and said second optimization is optimization for all of said plurality of process constraint conditions, and accepting an input for requirement specification of a circuit design;
    an optimal solution generation means for carrying out a processing comprising:
       upon accepting said designation of said first optimization, reading out, as pareto optimal solution data, data for said specific process constraint condition, from a pareto-per-process data storage device storing first sets of an identifier of a circuit configuration, values of plural design variables and values of plural items in said requirement specification, wherein each of said first sets corresponds to each of pareto optimal solutions for each of said process constraint conditions;
       upon accepting said designation of said second optimization, reading out, as pareto optimal solution data, data from an entire pareto data storage device storing second sets of a combination of an identifier of a circuit configuration and an identifier of a process constraint condition, value of plural design variables and values of plural items in said requirement specification, wherein each of said second sets corresponds to each of pareto optimal solutions for each combination of said process constraint condition and said circuit configuration;
       calculating, as a provisional optimal solution, a point whose distance from a point corresponding to said requirement specification after space conversion of a solution specification space to balance value distribution for said plural items in said requirement specification, is shortest and which is on a pareto curve of second pareto optimal solutions obtained after said space conversion is carried out for pareto optimal solutions included in the read pareto optimal solution data, in said solution specification space after said space conversion;
       extracting a pareto optimal solution close to said provisional optimal solution in said solution specification space after said space conversion, from said second pareto optimal solutions, and identifying circuit configuration for said provisional optimal solution from the extracted pareto optimal solution close to said provisional optimal solution; and
       mapping said provisional optimal solution to values of said plural design variables in the identified circuit configuration; and
    an output means for outputting an identifier of the identified circuit configuration and said values of said plural design variables in the identified circuit configuration, which are obtained by the mapping.

11. An automatic circuit design apparatus, comprising:
    a process constraint condition storage device for storing a plurality of process constraint conditions, which are constraint conditions for manufacturing processes; and
    a processor executing an operation, the operation comprising:
       accepting designation of first optimization or second optimization, wherein said first optimization is optimization for a specific process constraint condition among said plurality of process constraint conditions stored in said process constraint condition storage device, and said second optimization is optimization for all of said plurality of process constraint conditions, and accepting an input for requirement specification of a circuit design;

upon accepting said designation of said first optimization, reading out, as pareto optimal solution data, data for said specific process constraint condition, from a pareto-per-process data storage device storing first sets of an identifier of a circuit configuration, values of plural design variables and values of plural items in said requirement specification, wherein each of said first sets corresponds to each of pareto optimal solutions for each of said process constraint conditions;

upon accepting said designation of said second optimization, reading out, as pareto optimal solution data, data from an entire pareto data storage device storing second sets of a combination of an identifier of a circuit configuration and an identifier of a process constraint condition, value of plural design variables and pertinent values of plural items in said requirement specification, wherein each of said second sets corresponds to each of pareto optimal solutions for each combination of said process constraint condition and said circuit configuration;

calculating, as a provisional optimal solution, a point whose distance from a point corresponding to said requirement specification after space conversion of a solution specification space to balance value distribution for said plural items in said requirement specification, is shortest and which is on a pareto curve of second pareto optimal solutions obtained after said space conversion is carried out for pareto optimal solutions included in the read pareto optimal solution data, in said solution specification space after said space conversion;

extracting a pareto optimal solution close to said provisional optimal solution in said solution specification space after said space conversion, from said second pareto optimal solutions, and identifying circuit configuration for said provisional optimal solution from the extracted pareto optimal solution close to said provisional optimal solution; and mapping said provisional optimal solution to values of said plural design variables in the identified circuit configuration; and outputting an identifier of the identified circuit configuration and said values of said plural design variables in the identified circuit configuration, which are obtained by the mapping.

* * * * *